(12) United States Patent
Miyata et al.

(10) Patent No.: US 9,120,067 B2
(45) Date of Patent: Sep. 1, 2015

(54) MICRO MIXER AND MICROFLUIDIC CHIP

(75) Inventors: Kenichi Miyata, Amagasaki (JP); Takahiro Mohri, Izumi (JP); Kusunoki Higashino, Osaka (JP); Yasuhiro Sando, Amagasaki (JP); Masashi Nishikado, Osaka (JP); Gou Yanagihara, Sakai (JP)

(73) Assignee: KONICA MINOLTA, INC. (JP)

( * ) Notice: Subject to any disclaimer, the term of this patent is extended or adjusted under 35 U.S.C. 154(b) by 0 days.

(21) Appl. No.: 13/395,592

(22) PCT Filed: Dec. 13, 2010

(86) PCT No.: PCT/JP2010/072372
§ 371 (c)(1),
(2), (4) Date: Mar. 12, 2012

(87) PCT Pub. No.: WO2011/081072
PCT Pub. Date: Jun. 21, 2012

(65) Prior Publication Data
US 2012/0201724 A1 Aug. 9, 2012

(30) Foreign Application Priority Data

Sep. 25, 2009 (JP) ................. 2009-219924

(51) Int. Cl.
| B81B 1/00 | (2006.01) |
|---|---|
| B01F 15/00 | (2006.01) |
| B01F 5/00 | (2006.01) |
| B01F 11/00 | (2006.01) |
| B01J 19/00 | (2006.01) |
| B01L 3/00 | (2006.01) |

(52) U.S. Cl.
CPC ......... *B01F 15/00876* (2013.01); *B01F 5/0065* (2013.01); *B01F 11/0074* (2013.01); *B01J 19/0093* (2013.01); *B01L 3/5027* (2013.01); *B01J 2219/00783* (2013.01); *B01J 2219/00889* (2013.01); *B01L 2200/027* (2013.01); *B01L 2200/0636* (2013.01); *B01L 2200/0684* (2013.01); *B01L 2300/0816* (2013.01); *B01L 2300/0858* (2013.01); *B01L 2300/0867* (2013.01); *B01L 2400/049* (2013.01)

(58) Field of Classification Search
CPC ........... B01J 19/0093; B01L 2200/027; B01L 3/5027
See application file for complete search history.

(56) References Cited

U.S. PATENT DOCUMENTS

| 2002/0106786 A1* | 8/2002 | Carvalho et al. ........... 435/287.3 |
| 2005/0026301 A1* | 2/2005 | Petithory ..................... 436/180 |

* cited by examiner

*Primary Examiner* — Paul Hyun
(74) *Attorney, Agent, or Firm* — Cantor Colburn LLP

(57) ABSTRACT

There are provided a micro mixer capable of efficiently mixing at least two types of liquids in a simple structure and a microfluidic chip provided with the micro mixer. In order to achieve the object, the micro mixer includes a minute passage through which first and second liquids are caused to flow respectively, and a mixing vessel in which a liquid injecting port caused to communicate with the minute passage is provided in a bottom part, and the liquid injecting port is provided in a shifted position from a center of the bottom part in the bottom part. Moreover, the liquid injecting port may be provided in a shifted position from a center line of the mixing vessel.

20 Claims, 17 Drawing Sheets

F I G. 1
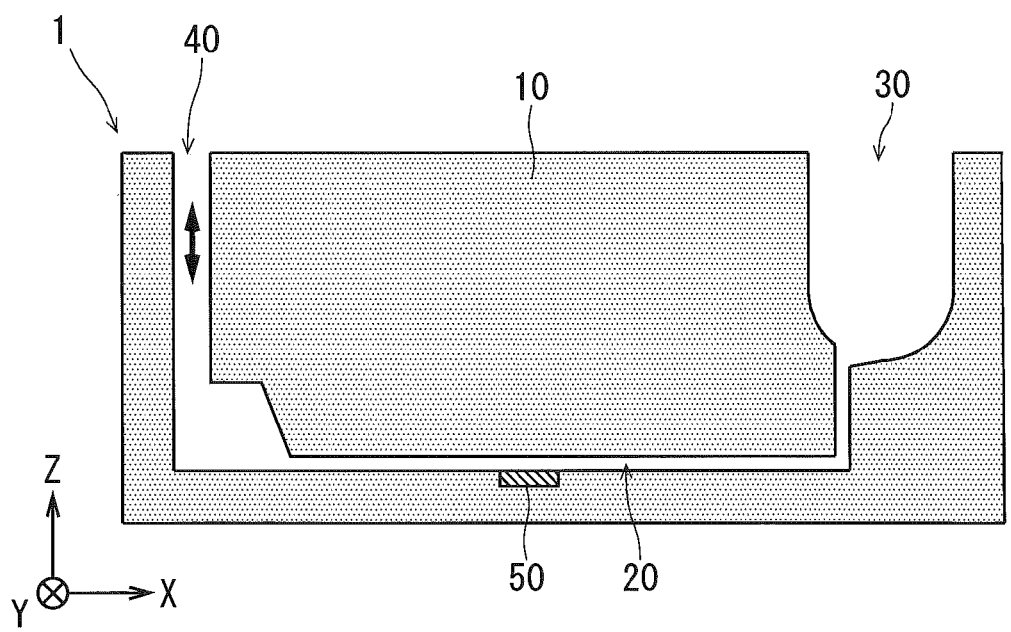
F I G. 2
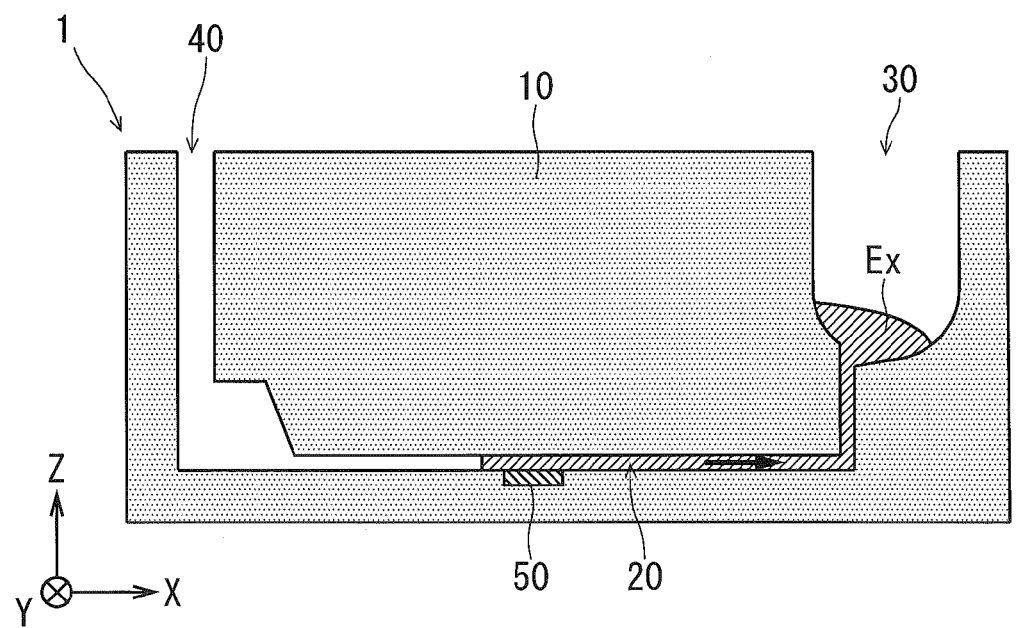

F I G. 3
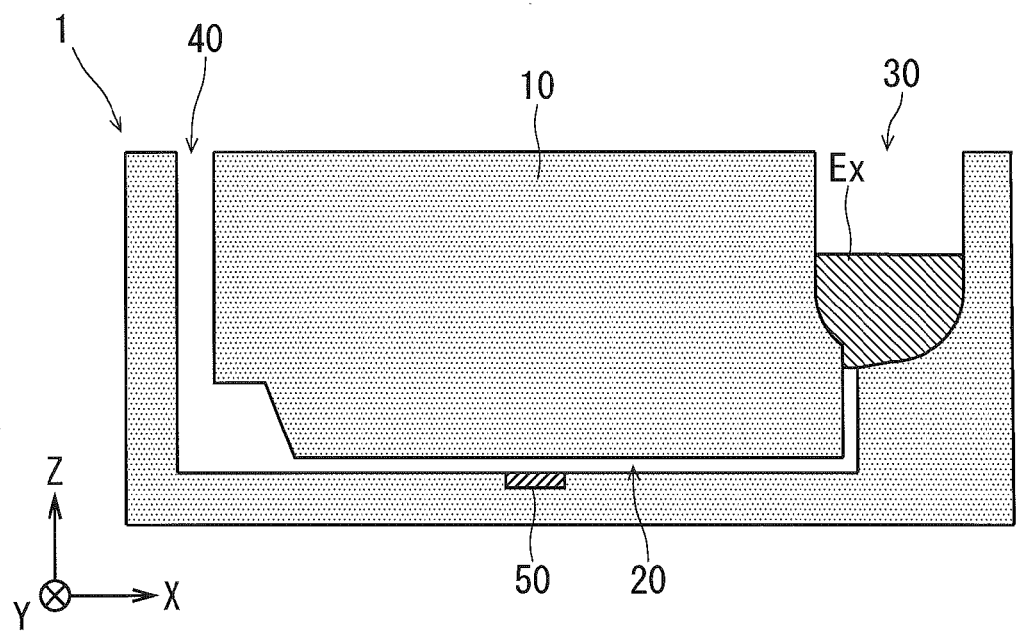
F I G. 4
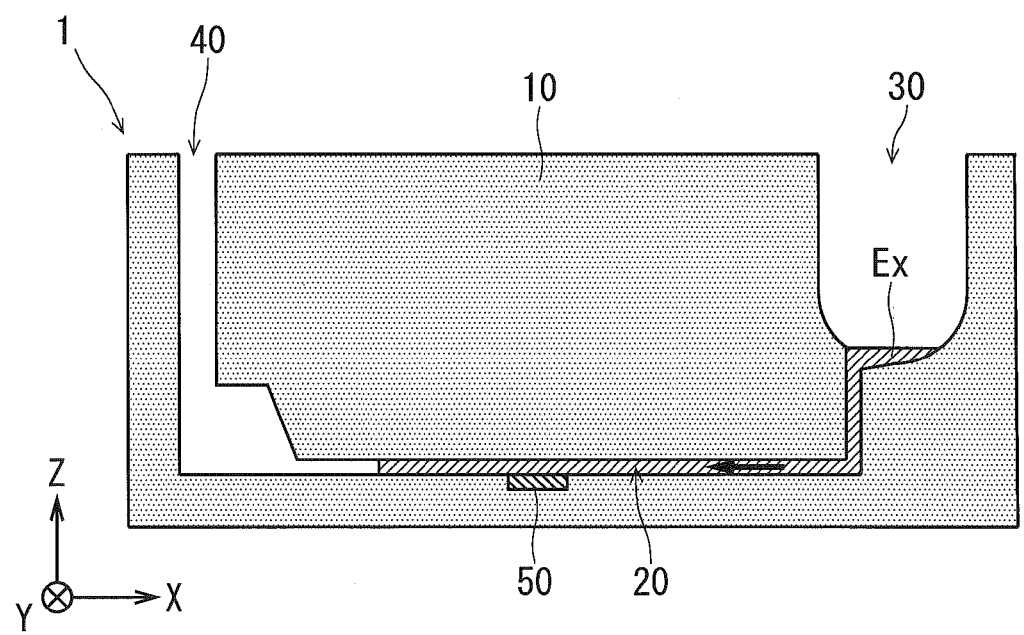

MICRO MIXER AND MICROFLUIDIC CHIP

CROSS REFERENCE TO RELATED APPLICATIONS

This is a U.S. national stage of application No. PCT/JP2010/072372, filed on 13 Dec. 2010. Priority under 35 U.S.C. §119(a) and 35 U.S.C. §365(b) is claimed from Japanese Application No. 2009-219924, filed 25 Sep. 2009, the disclosure of which are also incorporated herein by reference.

TECHNICAL FIELD

The present invention relates to a micro mixer for mixing at least two types of liquids in a minute structure, and a microfluidic chip capable of mixing at least two types of liquids in a structure having a minute passage.

BACKGROUND ART

Conventionally, there is known a microfluidic chip for supplying a plurality of liquids to a minute passage, thereby mixing the liquids and causing this to react.

In the minute passage, a width and a depth have small size of several micrometers to several hundred micrometers. In addition, a flow rate of the liquid is also reduced in the minute passage. For this reason, in the minute passage, Reynolds number of a fluid is equal to or smaller than several hundreds and the same turbulent flow control as that in the conventional reacting device cannot be obtained but a mode for a laminar flow control is obtained.

Under the laminar flow control, different types of liquids are mainly mixed by a molecular diffusion over a contact interface between the respective liquids. A behavior of the mixture in the liquids is defined by a thickness in a diffusing direction of the liquid (a distance at which the different types of liquids are to be diffused to obtain a uniform concentration=a diffusion distance), and furthermore, a long time is required for the mixture.

Therefore, there is proposed the technique in which two types of liquids are divided into a plurality of flows respectively and the flows are alternately arranged and supplied so that a contact area between the liquids of the different types is increased to promote a mixture of the liquids (for example, Japanese Patent Application Laid-Open No. 2006-43617 and the like). Moreover, there is proposed the technique in which different types of fluids are introduced from a lower part of a cylindrical mixing vessel so as to generate a rotational flow, thereby promoting a mixture of the fluids (for example, Japanese Patent Application Laid-Open No. 2006-167600 and the like).

SUMMARY OF THE INVENTION

Problems to be Solved by the Invention

In the technique of Patent Document 1 described above, however, there is required the long passage to be used for the mixture utilizing the diffusion and the structure for dividing each of the liquids and discharging the liquids like a layer is large-scaled. For this reason, the apparatus is made complicated and large sized.

In the technique of Patent Document 2 described above, moreover, if the size of the mixing vessel is not proper for the flow rate of the liquid, the rotational flow of the liquid is not generated. Furthermore, the liquid introduced from the lower part of the mixing vessel is taken out from the upper part of the mixing vessel. For this reason, the liquid remaining in the mixing vessel is lost. Accordingly, the technique is unstable for the mixture of the liquids of which quantities are determined.

The present invention has been made in consideration of the problems and an object thereof is to provide a micro mixer capable of efficiently mixing at least two types of liquids in a simple structure and a microfluidic chip provided with the micro mixer.

Means for Solving the Problems

In order to solve the problems, a micro mixer according to a first aspect includes a minute passage through which first and second liquids are caused to flow, and a mixing vessel in which a liquid injecting port caused to communicate with the minute passage is provided in a bottom part. In the micro mixer, the liquid injecting port is provided in a shifted position from a center of the bottom part in the bottom part.

A micro mixer according to a second aspect includes a minute passage through which first and second liquids are caused to flow, and a mixing vessel in which a liquid injecting port caused to communicate with the minute passage is provided in a bottom part. In the micro mixer, the liquid injecting port is provided in a shifted position from a center line of the mixing vessel.

A micro mixer according to a third aspect includes a minute passage through which first and second liquids are caused to flow, and a mixing vessel in which a liquid injecting port caused to communicate with the minute passage is provided in a bottom part. In the micro mixer, in a section in a horizontal direction of an internal space region surrounded by an internal wall of the mixing vessel, a first distance from a position through which a virtual line that is virtually extended upward from a center of the liquid injecting port passes to the internal wall in relation to a one direction is different from a second distance from a position through which the virtual line passes to the internal wall in relation to an opposite direction to the one direction.

A micro mixer according to a fourth aspect is directed to the micro mixer according to any of the first to third aspects, wherein at least one convex portion is provided in the bottom part of the mixing vessel.

A micro mixer according to a fifth aspect is directed to the micro mixer according to any of the first to fourth aspects, wherein a first variation of an angle formed by an internal wall surface of the mixing vessel and a horizontal surface in a passage advanced by a predetermined distance in a first direction from the liquid injecting port over the internal wall surface of the mixing vessel is different from a second variation of an angle formed by the internal wall surface of the mixing vessel and the horizontal surface in a path advanced by the predetermined distance in a second direction which is opposite to the first direction from the liquid injecting port over the internal wall surface of the mixing vessel.

A micro mixer according to a sixth aspect is directed to the micro mixer according to the fifth aspect, wherein the first variation is relatively greater than the second variation, and an inclined portion tapered toward the liquid injecting port is provided in the second direction based on the liquid injecting port in the bottom part of the mixing vessel.

A micro mixer according to a seventh aspect is directed to the micro mixer according to any of the first to sixth aspects, wherein a surface of an internal wall of the mixing vessel has water repellency.

A micro mixer according to an eighth aspect is directed to the micro mixer according to any of the first to seventh aspects, wherein the liquid injecting port discharges a liquid stored in the mixing vessel toward the minute passage.

A micro mixer according to a ninth aspect is directed to the micro mixer according to any of the first to eighth aspects, wherein there are further provided a first supplying path configured to supply the first liquid to the minute passage, and a second supplying path configured to supply the second liquid to the minute passage.

A microfluidic chip according to a tenth aspect includes the micro mixer according to any of the first to ninth aspects, and a reactor which is provided in the vicinity of an internal wall surface of a passage through which a mixed liquid generated by mixing the first and second liquids in the mixing vessel is to be discharged from the mixing vessel and to which a reactant for carrying out a reaction to a substance contained in the mixed liquid is fixed.

Effects of the Invention

According to the micro mixer in accordance with any of the first to ninth aspects, when at least two types of liquids are injected from the liquid injecting port into the mixing vessel for the same period of time, there is generated a flow through which the at least two types of liquids are easily mixed in the mixing vessel. Therefore, it is possible to efficiently mix the at least two types of liquids with a simple structure.

According to the micro mixer in accordance with the fourth aspect, when the liquid gets over a convex portion provided in the bottom part, there is readily generated a turbulent flow through which at least two types of liquids are easily mixed.

According to the micro mixer in accordance with the fifth aspect, there is readily generated convection through which at least two types of liquids are easily mixed.

According to the micro mixer in accordance with the six aspect, for example, when the liquid stored in the mixing vessel is discharged from the liquid injecting port, by the presence of an inclined portion, the liquid is left in the mixing vessel with difficulty so that the liquid can be prevented from being wasted.

According to the micro mixer in accordance with the seventh aspect, there are sequentially and readily generated the case in which a force for the liquid to advance laterally due to gravity and a force for suppressing the lateral advance of the liquid due to a surface tension in the bottom part of the mixing vessel are set into an equilibrium state and the case in which they are not set into the equilibrium state. Consequently, it is possible to readily generate a turbulent flow through which at least two types of liquids can easily be mixed.

According to the micro mixer in accordance with the eighth aspect, the liquid stored in the mixing vessel is discharged from the liquid injecting port provided in the bottom part of the mixing vessel. Therefore, it is possible to prevent the liquid from being left in the mixing vessel with a simple structure. Accordingly, the liquid can be prevented from being wasted.

According to the microfluidic chip in accordance with the tenth aspect, at least two types of liquids are mixed efficiently in the micro mixer. Therefore, it is possible to cause the mixed liquid and the reactor to react rapidly.

BRIEF DESCRIPTION OF THE DRAWINGS

FIG. 1 is a typical sectional view showing a schematic structure of a microfluidic chip according to an embodiment.

FIG. 2 is a view showing motion of a test solution in the microfluidic chip according to the embodiment.

FIG. 3 is a view showing motion of the test solution in the microfluidic chip according to the embodiment.

FIG. 4 is a view showing motion of the test solution in the microfluidic chip according to the embodiment.

EMBODIMENTS FOR CARRYING OUT THE INVENTION

Figure 5:
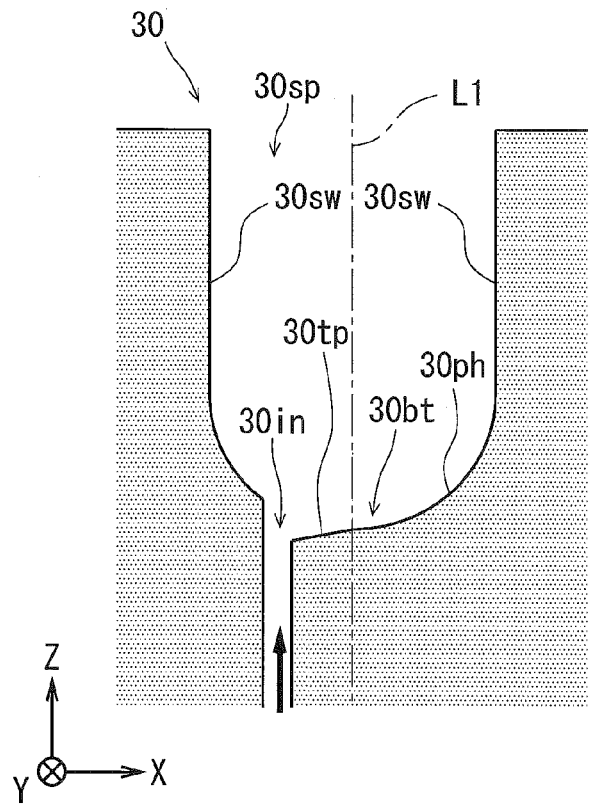
FIG. 5 is a typical sectional view showing a structure of a mixing vessel according to the embodiment.

An embodiment according to the present invention will be described below with reference to the drawings.

<(1) Schematic Structure of Microfluidic Chip>

FIG. 1 is a typical sectional view showing a schematic structure of a microfluidic chip 1 according to an embodiment. In FIG. 1 and the other succeeding drawings to FIG. 1, three axes of X, Y and Z which are orthogonal to each other are provided in order to clarify a relationship between directions.

The microfluidic chip 1 is a device for supplying a liquid to a minute passage having a width and a depth of several micrometers to several hundred micrometers, for example, and carrying out a mixture and reaction of liquids based on a behavior of a molecule or a particle constituting the liquid. The microfluidic chip 1 includes a block-shaped body part 10, a minute passage 20 extended straight in the body part 10, a mixing vessel 30 for promoting a mixture of test solutions which are caused to flow to the minute passage 20, an injecting/discharging port 40 for injecting/discharging a test solution and air to/from the minute passage 20, and a reactor 50 provided in such a manner that a reacting surface thereof is exposed into the minute passage 20.

The body part 10 is constituted by using a resin such as polycarbonate or polypropylene, and has a size, for example, a width of approximately 50 mm, a depth of approximately 50 mm and a height of approximately 10 mm. Moreover, a plurality of portions constituting the body part 10 are formed separately by cutting or injection molding and is bonded to each other with an adhesive or the like so that the body part 10 is finished.

The minute passage 20 has a size having a width of approximately 1 to 3 mm and a height of approximately several tens micrometers to 1 mm, for example, and is not restricted thereto. Moreover, a passage length is not particularly restricted. In the case in which a flow of a test solution is a laminar flow in the minute passage 20 under a condition of the passage (the size or the like), however, the present invention acts more effectively so that a great advantage can be produced.

The mixing vessel 30 is provided to communicate with one of ends of the minute passage 20 and serves as a minute mixing machine (a micro mixer) for mixing and stirring the test solution to be injected into the mixing vessel 30. Moreover, the mixing vessel 30 has a volume which is equal to or greater than a specified amount of the test solution. The mixing vessel 30 includes a structure in which the test solution can easily be promoted to be mixed and stirred as will be described below.

The injecting/discharging port 40 is provided to communicate with the other end of the minute passage 20. Moreover, a supply source for the test solution is connected to the injecting/discharging port 40 and a pump for injecting and discharging the test solution is connected thereto. The pump for injecting the test solution from the injecting/discharging port 40 and discharging the test solution from the injecting/discharging port 40 may be connected to the mixing vessel 30.

The reactor 50 is provided on a lower surface of the minute passage 20 in a middle position between portions with which the mixing vessel 30 and the injecting/discharging port 40 communicate in the minute passage 20, respectively. In the reactor 50, biochemicals diffused in the test solution passing through the vicinity of the reactor 50 react. The test solution may include a blood plasma or the like obtained by centrifugally separating blood taken from an organism, for example, and biochemicals contained in the test solution may include various antigens or the like present in the blood. Moreover, a reacting substance constituting the reactor 50 may include an antibody which can specifically react to the antigen and the like, for example.

<(2) Rough Flow of Test Solution in Microfluidic Chip>

FIGS. 2 to 4 are views for explaining a rough flow of a test solution Ex in the microfluidic chip 1.

In a test, as shown in FIG. 2, the test solution Ex is injected from an outside of the microfluidic chip 1 to the minute passage 20 through the injecting/discharging port 40, and furthermore, the test solution Ex is injected into the mixing vessel 30 via the minute passage 20 at first. As shown in FIG. 3, then, the test solution Ex is once stored in the mixing vessel 30. As shown in FIG. 4, next, the test solution Ex stored in the mixing vessel 30 passes through the minute passage 20 and is thus discharged from the injecting/discharging port 40 to the outside of the microfluidic chip 1.

For a period from the injection of the test solution Ex into the microfluidic chip 1 to the discharge thereof, the test solution Ex reacts in the reactor 50. More specifically, in each of the movement of the test solution Ex from the injecting/discharging port 40 to the mixing vessel 30 and the movement of the test solution Ex from the mixing vessel 30 to the injecting/discharging port 40, the test solution Ex reacts in the reactor 50.

In the case in which the flow of the test solution Ex in the minute passage 20 is a laminar flow, a concentration of the biochemicals of the test solution Ex in the vicinity of the reactor 50 is reduced by the reaction to the reactor 50. For this reason, when the test solution Ex is moved from the injecting/discharging port 40 to the mixing vessel 30, the test solution Ex is divided into a test solution (a high concentration test solution) containing biochemicals in a relatively high concentration which flows through an upper part of the minute passage 20 and a test solution (a low concentration test solution) containing biochemicals in a relatively low concentration which flows through a lower part of the minute passage 20 by the reaction to the reactor 50.

The flow of the test solution Ex in the minute passage 20 is the laminar flow. For this reason, if the high concentration test solution and the low concentration test solution are neither mixed nor stirred in portions other than the minute passage 20, the reaction of the test solution Ex and the reactor 50 progresses with difficulty when the test solution Ex is discharged from the injecting/discharging port 40 via the minute passage 20. In the microfluidic chip 1 according to the present embodiment, however, the mixing vessel 30 includes a structure in which the test solution Ex can easily be mixed and stirred as will be described below.

When the test solution Ex to be a mixed liquid generated by mixing the high concentration test solution and the low concentration test solution in the mixing vessel 30 is discharged from the mixing vessel 30, therefore, it reacts to the reactor 50 provided in the vicinity of an internal wall surface in the lower part of the minute passage 20.

By detecting a change in an optical property of an solid-phased surface of the reactor 50 from an outside after discharging the test solution Ex from the microfluidic chip 1, for example, an immunoreaction of an antigen and an antibody is measured. For the detection in this case, an optical apparatus may be used or a visual recognition by human eyes may be utilized. If a material of the body part 10 is constituted by a transparent resin or the like, an observation from the outside can easily be carried out.

<(3) Structure of Mixing Vessel>

Figure 6:
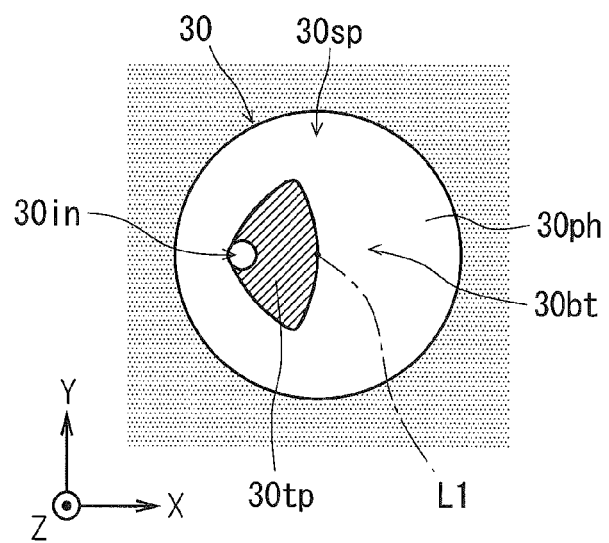
FIG. 6 is a typical plan view showing the structure of the mixing vessel according to the embodiment.

FIG. 5 is a typical sectional view showing a structure of the mixing vessel 30 and FIG. 6 is a typical top view showing the structure of the mixing vessel 30. FIG. 5 shows a view showing a section (an XZ section) which is parallel with an XZ plane of the mixing vessel 30, and FIG. 6 shows a view showing the mixing vessel 30 as seen in a +Z direction.

As shown in FIGS. 5 and 6, the mixing vessel 30 is a vessel part in which an upper part (the +Z direction) is opened and a liquid injecting port 30*in* is provided in a bottom part 30*bt*.

A space (an internal space region) 30*sp* surrounded by an internal wall of the mixing vessel 30 is formed in such a manner that a section (an XY section) which is parallel with a perpendicular plane to a Z axis except for the vicinity of the liquid injecting port 30*in* takes an almost circular shape. From another viewpoint, the internal space region 30*sp* takes such a shape as to be rotational symmetrical with respect to every direction around an axis L1 which is parallel with the Z axis except for the vicinity of the liquid injecting port 30*in*. In other words, furthermore, the axis L1 is a straight line penetrating, in a vertical direction (a direction of the Z axis), a position of a center of gravity in each XY section of the internal space region 30*sp* except for the vicinity of the liquid injecting port 30*in*. The axis L1 will be hereinafter referred to as a line (a center line) indicative of a center of the mixing vessel 30.

In the case in which positions of the centers of gravity of the XY sections in the internal space region 30*sp* are not put on a single straight line, a straight line which approximately penetrates the positions of the centers of gravity in the XY sections may be obtained as the center line L1 from the positions of the centers of gravity in the XY sections by an approximate calculation.

Moreover, a side surface (a side wall part) 30*sw* of the internal wall of the mixing vessel 30 which forms the internal space region 30*sp* constitutes an almost parallel wall surface with the Z axis.

The liquid injecting port 30*in* is provided in a shifted position from the axis L1 in a −X direction in the bottom part 30*bt* of the mixing vessel 30. The liquid injecting port 30*in* is caused to communicate with the minute passage 20. For this reason, the test solution Ex is injected from the minute passage 20 into the internal space region 30*sp* through the liquid injecting port 30*in*. A passage connecting the liquid injecting port 30*in* and the minute passage 20 is extended in a direction along the Z axis. Therefore, a direction of the flow of the test solution Ex injected from the liquid injecting port 30*in* to the internal space region 30*sp* is a +Z direction. Moreover, the liquid injecting port 30*in* also serves to discharge the test solution Ex stored in the mixing vessel 30 toward the minute passage 20.

The bottom part 30*bt* is a portion in which the XY section of the internal space region 30*sp* thereof is gradually narrowed downward (the −Z direction). More specifically, the XY section of the internal space region 30*sp* of the bottom part 30*bt* is more narrowed when it approaches the liquid injecting port 30*in*. Thus, the liquid injecting port 30*in* is provided in a shifted position from a center of the bottom part 30*bt*.

The center of the bottom part 30*bt* is a portion of the bottom part 30*bt* through which a straight line penetrating a center of gravity of a plane region obtained by projecting the bottom part 30*bt* onto the XY plane in a vertical direction (a direction of the Z axis) passes. Moreover, the center of the bottom part 30*bt* may be a portion through which an approximate straight line penetrating the centers of gravity of the XY sections in a space region formed by the bottom part 30*bt* in the internal space region 30*sp* in the vertical direction (the direction of the Z axis) passes. Furthermore, the center of the bottom part 30*bt* is almost identical to a portion through which the axis L1 passes.

In addition, the bottom part 30*bt* includes the liquid injecting port 30*in*, a liquid storing part 30*ph* and an inclined part 30*tp*. In the liquid storing part 30*ph*, there is formed a space taking an almost semicircular shape which is downward convex. Moreover, the inclined part 30*tp* takes an almost constant inclination from a portion in the vicinity of a point through which the axis L1 passes toward the liquid injecting port 30*in*.

As shown in FIG. 6, the inclined part 30*tp* is constituted to have a surface taking a shape of a fan setting the liquid injecting port 30*in* portion as a pivot (an oblique line portion in FIG. 6) as seen from above (the +Z direction). In other words, the inclined part 30*tp* is tapered toward the liquid injecting port 30*in*. Moreover, the inclined part 30*tp* takes a configuration in which a certain inclination is held irrespective of an advance in any direction on the basis of the liquid injecting port 30*in*. By the presence of the inclined part 30*tp*, the discharge of the test solution Ex from the liquid injecting port 30*in* is promoted. Therefore, the test solution Ex is prevented from being left in the mixing vessel 30. If a liquid is left in the mixing vessel 30 with difficulty, the test solution Ex is also prevented from being wasted.

Irrespective of an advance in any direction over the inclined part 30*tp* from the liquid injecting port 30*in*, moreover, an angle formed by the inclined part 30*tp* with respect to a horizontal plane is rapidly changed in a portion approaching the liquid storing part 30*ph*. For this reason, any curved surface of the inclined part 30*tp* and the liquid storing part 30*ph* is also discontinuous in a boundary between the inclined part 30*tp* and the liquid storing part 30*ph* so that there is formed a portion corresponding to a convex part protruded gently in the vicinity of the boundary.

Figure 7:
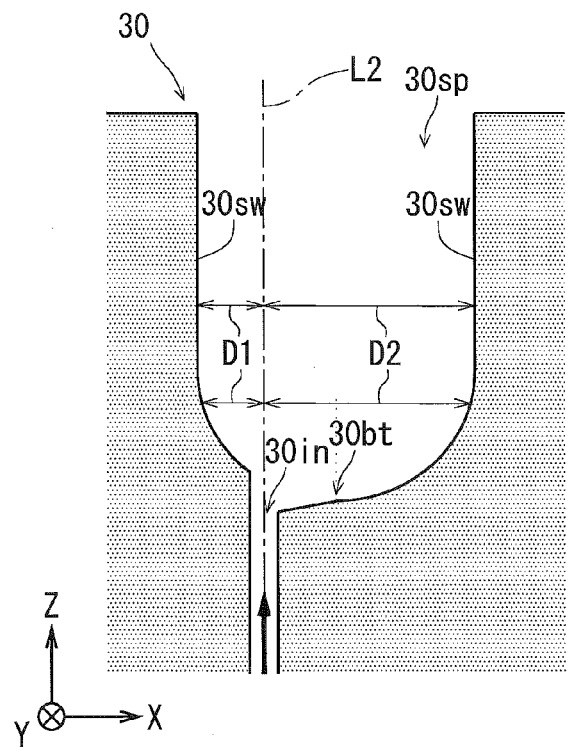
FIG. 7 is a view for explaining the structure of the mixing vessel according to the embodiment.

FIG. 7 is a view for explaining the structure of the mixing vessel 30 from a further viewpoint. In FIG. 7, a section (an XZ section) which is parallel with the XZ plane of the mixing vessel 30 is shown and a line (a virtual line) L2 extended virtually upward (in the +Z direction) via the center of the liquid injecting port 30*in* is attached in the same manner as in FIG. 5.

As shown in FIG. 7, referring to the same Z coordinates, a distance D1 from the virtual line L2 to the internal wall surface of the mixing vessel 30 in the −X direction is different from a distance D2 from the virtual line L2 to the internal wall surface of the mixing vessel 30 in the +X direction. In other words, in the XY section in a horizontal direction of the internal space region 30*sp*, the distance D1 from a position through which the virtual line L2 passes to the internal wall in a one direction (for example, the −X direction) is different from the distance D2 from the position through which the virtual line L2 passes to the internal wall in an opposite direction to the one direction (for example, +X direction).

Taking note of a change in the inclination of the internal wall of the mixing vessel 30, furthermore, the internal wall of the mixing vessel 30 reaches the side wall part 30*sw* extended in a vertical direction depending on a change in an X coordinate which is relatively shorter in the −X direction based on the liquid injecting port 30*in* than in the +X direction based on the liquid injecting port 30*in* as shown in FIG. 7.

In other words, taking note of a variation in the angle formed by the internal wall of the mixing vessel 30 with respect to the horizontal plane (the XY plane) (the variation in the angle of the internal wall), when based on the position of the liquid injecting port 30*in*, a variation in the angle of the internal wall with respect to a movement at a predetermined distance in the +X direction is different from a variation in the angle of the internal wall with respect to a movement at a predetermined distance in the −X direction.

In other words, furthermore, a first variation and a second variation which will be defined below are different from each other. The first variation is equivalent to an amount of a change in an angle formed by the internal wall and the horizontal plane (in this case, the XY plane) in a path advanced by a predetermined distance in a first direction (for example, the −X direction) from the liquid injecting port 30*in* during going from the bottom part 30*bt* to the side wall part 30*sw* over the internal wall surface of the mixing vessel 30. Moreover, the second variation is equivalent to an amount of a change in an angle formed by the internal wall and the horizontal plane (in this case, the XY plane) in a path advanced by a predetermined distance in a second direction which is opposite to the first direction (for example, the +X direction) from the liquid injecting port 30*in* during going from the bottom part 30*bt* to the side wall part 30*sw* over the internal wall surface of the mixing vessel 30.

In the present embodiment, the liquid injecting port 30*in* is provided in a position shifted in the first direction from the center of the bottom part 30*bt*, and furthermore, the inclined part 30*tp* is provided in the second direction based on the liquid injecting port 30*in* in the bottom part 30*bt* of the mixing vessel 30. Consequently, the first variation is relatively larger than the second variation.

<(4) Convection of Test Solution Generated in Mixing Vessel>

Figure 8:
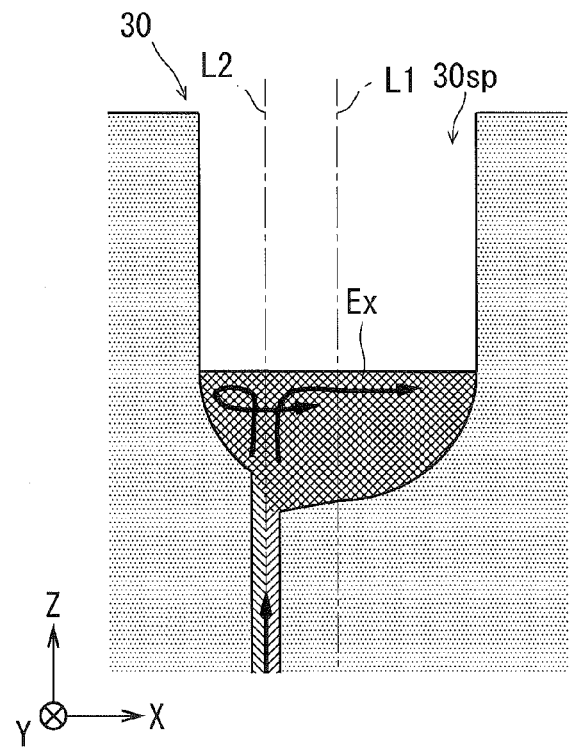
FIG. 8 is a view for explaining convection of a test solution in the mixing vessel according to the embodiment.

FIG. 8 is a view for explaining convection of the test solution Ex to be injected from the liquid injecting port 30*in* to an internal space region 30*sp*. FIG. 8 shows rough flows of a high concentration test solution and a low concentration test solution by arrows shown in thick lines.

As described above, the liquid injecting port 30*in* is provided in a shifted position from the center line L1 of the mixing vessel 30, and furthermore, is provided in a shifted position from the center of the bottom part 30*bt*. For this reason, a space region on a −X side based on the virtual line L2 in the internal space region 30*sp* is smaller than a space region on a +X side based on the liquid injecting port 30*in*.

By such a structure, the test solution Ex (the high concentration test solution) to be injected from a portion on the −X side of the liquid injecting port 30*in* once flows into a space region on the −X side in the internal space region 30*sp*. However, the space region on the −X side is small. For this reason, the high concentration test solution tends to flow into a space region +X side in the internal space region 30*sp*. The flow of the high concentration test solution tends to be joined with the flow of the test solution Ex (the low concentration test solution) to be injected into the space region on the +X side in the internal space region 30*sp* from a portion on the +X side of the liquid injecting port 30*in*. By the structure of the mixing vessel 30, therefore, there is generated convection of the test solution Ex in which the high concentration test solution and the low concentration test solution are easily mixed and stirred. At this time, the flow of the test solution Ex in the internal space region 30*sp* tends to be a turbulent flow.

Figure 9:
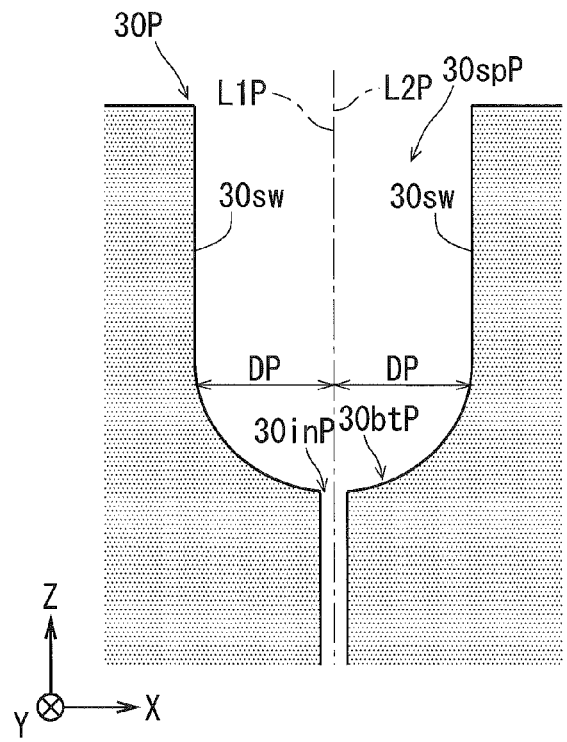
FIG. 9 is a view for explaining a structure of a mixing vessel according to a comparative example.

FIG. 9 is a typical sectional view showing a structure of a mixing vessel 30P according to a comparative example in which the liquid injecting port 30*in* is moved onto the center line L1 of the mixing vessel 30 and is thus moved to the center of the bottom part 30*bt* and the inclined part 30*tp* is removed when based on the mixing vessel 30 according to the present embodiment.

As shown in FIG. 9, in the mixing vessel 30P according to the comparative example, a liquid injecting port 30*in*P is provided on a center line L1P of the mixing vessel 30P and is provided on a center of a bottom part 30*bt*P. For this reason, the center line L1P of the mixing vessel 30P is identical to a virtual line L2P extended in a +Z direction from a center of the liquid injecting port 30*in*P. In an internal space region 30*sp*P of the mixing vessel 30P, accordingly, a distance DP from the virtual line L2P to an internal wall in an optional position of the mixing vessel 30P is almost constant in each XY section.

Figure 10:
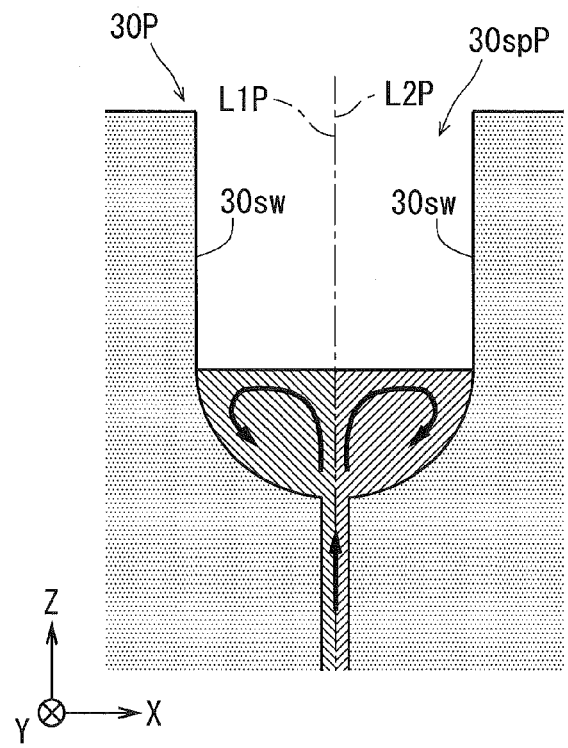
FIG. 10 is a view for explaining convection of the test solution in the mixing vessel according to the comparative example.

FIG. 10 is a view for explaining convection of a test solution Ex to be injected into the internal space region 30*sp*P from the liquid injecting port 30*in*P. In the same manner as FIG. 8, FIG. 10 shows rough flows of a high concentration test solution and a low concentration test solution by arrows shown in thick lines.

With the structure of the mixing vessel 30P according to the comparative example, a space region in a −X direction based on the liquid injecting port 30*in*P and a space region in a +X direction based on the liquid injecting port 30*in*P in the internal space region 30*sp*P have sizes which are almost equal to each other.

For this reason, the test solution Ex (the high concentration test solution) to be injected from a portion on the −X side of the liquid injecting port 30*in*P flows into a space region on the −X side in the internal space region 30*sp*P as shown in FIG. 10. On the other hand, the test solution Ex (the low concentration test solution) to be injected from a portion on the +X side of the liquid injecting port 30*in*P flows into a space region on the +X side in the internal space region 30*sp*P. As compared with the case of the mixing vessel 30 according to the present embodiment shown in FIG. 8, accordingly, such convection as to promote the mixture and stirring of the high concentration test solution and the low concentration test solution is generated relatively with difficulty.

<(5) Behavior of Test Solution in Initial Stage of Injection into Mixing Vessel>

According to the structure of the mixing vessel 30 in accordance with the present embodiment, the mixture and stirring of the high concentration test solution and the low concentration test solution are also promoted depending on the behavior of the test solution Ex in a stage (an initial stage of the injection) immediately after the test solution Ex is started to be injected into the mixing vessel 30.

FIGS. 11 to 16 are typical views showing a state of the test solution Ex in the mixing vessel 30 in the initial stage of the injection. In FIGS. 11 to 16, a shape of an inner edge of the XZ section in the vicinity of the bottom part 30*bt* of the mixing vessel 30 is drawn in a thick line, and a shape of the XZ section of a liquid level Exs in the test solution Ex is drawn in a solid line. With reference to FIGS. 11 to 16, the behavior of the test solution Ex in the mixing vessel 30 in the initial stage of the injection will be described below.

In the initial stage of the injection, the test solution Ex in the mixing vessel 30 exhibits the following behaviors (I) to (VI) in sequence.

Figure 11:
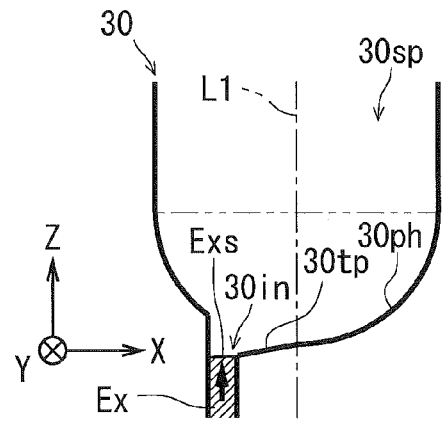
FIG. 11 is a view typically showing a behavior of the test solution in the mixing vessel according to the embodiment.

(I) As shown in FIG. 11, a headmost portion of the test solution Ex reaches the liquid injecting port 30*in* of the mixing vessel 30 from the minute passage 20. Before the state shown in FIG. 11 is brought, the liquid level Exs of the test solution Ex is moved in the +Z direction while an almost orthogonal state to a center line (a parallel line with the Z axis)

of the passage reaching the liquid injecting port 30*in* from the minute passage 20 is maintained.

Figure 12:
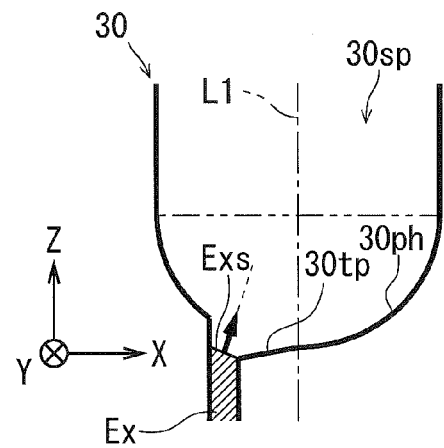
FIG. 12 is a view typically showing a behavior of the test solution in the mixing vessel according to the embodiment.
Figure 13:
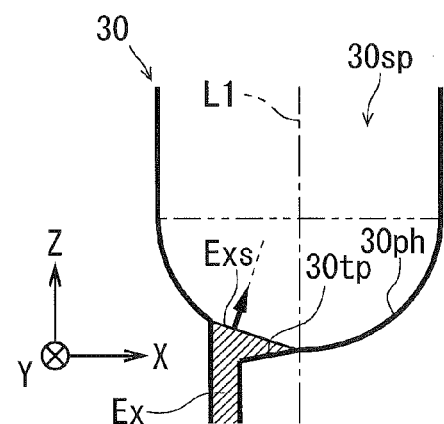
FIG. 13 is a view typically showing a behavior of the test solution in the mixing vessel according to the embodiment.

(II) When the liquid level Exs reaches a boundary between the liquid injecting port 30*in* and the inclined part 30*tp*, the liquid level Exs is brought into an inclining state at an almost certain angle with respect to the Z axis and gradually advances in the internal space region 30*sp* of the mixing vessel 30 as shown in FIGS. 12 and 13.

Figure 14:
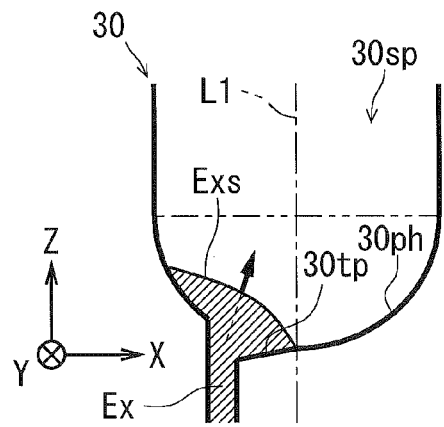
FIG. 14 is a view typically showing a behavior of the test solution in the mixing vessel according to the embodiment.

(III) When the liquid level Exs reaches a boundary between the inclined part 30*tp* and the liquid storing part 30*ph*, a force for suppressing an advance of the test solution Ex into the liquid storing part 30*ph* by a surface tension is greater than a force for an advance of the test solution Ex into the liquid storing part 30*ph* depending on a dead weight of the test solution Ex due to a difference between an angle of the inclined part 30*tp* and that of the liquid storing part 30*ph* based on the horizontal plane (the XY plane). At this time, as shown in FIG. 14, the amount of the test solution Ex to be injected into the internal space region 30*sp* is increased so that the shape of the liquid level Exs forms a convex surface.

Figure 15:
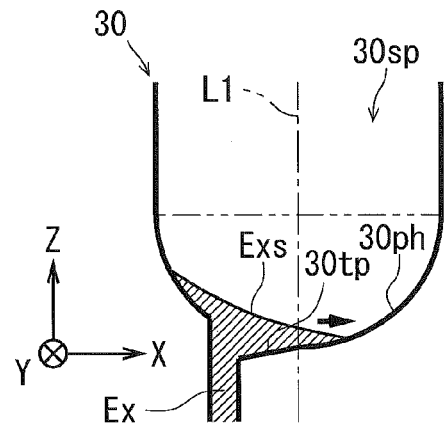
FIG. 15 is a view typically showing a behavior of the test solution in the mixing vessel according to the embodiment.

(IV) When the amount of the test solution Ex to be injected into the internal space region 30*sp* is increased so that a contact angle of the test solution Ex with respect to the bottom part 30*bt* exceeds a predetermined angle in the boundary between the inclined part 30*tp* and the liquid storing part 30*ph*, a force for the advance of the test solution Ex into the liquid storing part 30*ph* depending on the dead weight of the test solution Ex is greater than the force for suppressing the advance of the test solution Ex into the liquid storing part 30*ph* by the surface tension. At this time, as shown in FIG. 15, a balance of forces on an interface in which three phases, that is, a solid phase, a liquid phase and a gas phase are provided in contact with each other (a three-phase interface) is lost so that the test solution Ex vigorously flows into the liquid storing part 30*ph*, and furthermore, the liquid level Exs takes a shape of a concave surface. When the shape of the liquid level Exs is changed from the convex surface into the concave surface, thus, a portion of the test solution Ex in the vicinity of the liquid level Exs is shaken violently. As a result, a turbulent flow is generated in the vicinity of the liquid level Exs in the test solution Ex so that the mixture and stirring of the test solution Ex is promoted.

Figure 16:
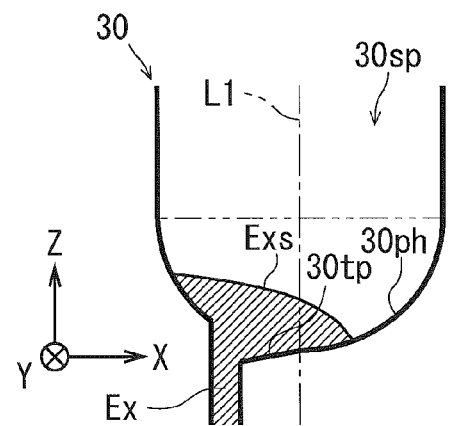
FIG. 16 is a view typically showing a behavior of the test solution in the mixing vessel according to the embodiment.

(V) As shown in FIG. 16, furthermore, the shape of the liquid level Exs forms the convex surface by setting a position of a new three-phase interface as a base point depending on the increase in the amount of the test solution Ex to be injected into the internal space region 30*sp*.

(VI) Then, the same behavior as the behavior (IV) is generated so that the mixture and stirring of the test solution Ex is promoted. The same behaviors as the behaviors (V) and (IV) are sequentially carried out.

Thus, the same behaviors as the behaviors (V) and (IV) are properly repeated alternately. Every time the same behavior as the behavior (IV) is generated, consequently, the liquid level Exs is violently shaken so that the mixture and stirring of the test solution Ex is promoted.

As described above, according to the microfluidic chip 1 in accordance with the present embodiment, when the high concentration test solution and the low concentration test solution are injected into the mixing vessel 30 for the same period of time, such a flow as to easily mix the high concentration test solution and the low concentration test solution is generated in the mixing vessel 30. Therefore, at least two types of liquids can be efficiently mixed by a simple structure.

When the test solution exceeds a convex portion formed on the boundary between the inclined part 30*tp* and the liquid storing part 30*ph* which are provided in the bottom part 30*bt*, moreover, such a turbulent flow as to easily mix at least two types of liquids tends to be generated.

At least two types of liquids are efficiently mixed in the mixing vessel 30. Therefore, the reaction of the test solution Ex to be a mixed liquid and the reactor 50 is carried out rapidly.

In order for the liquid level Exs of the test solution Ex to present the behaviors (I) to (VI) due to a surface tension in the mixing vessel 30, it is preferable that wettability of the test solution Ex with respect to the surface of the internal wall of the mixing vessel 30 should be low. In other words, it is preferable to bring a situation in which the contact angle of the test solution Ex caused by the surface tension might be increased with respect to the surface of the internal wall of the mixing vessel 30. In order to satisfy such a condition, for example, it is sufficient that the surface of the internal wall of the mixing vessel 30 is processed to have water repellency. The processing is implemented by various coating operations using fluorine and the like.

By such a structure, it is easy to remarkably and sequentially generate the case in which a force by which the test solution Ex tries to advance laterally due to gravity and a force for suppressing the lateral advance of the test solution Ex due to the surface tension in the bottom part 30*bt* of the mixing vessel 30 are set into an equilibrium condition and the case in which the equilibrium condition is lost. By the repetition of the equilibrium condition and a non-equilibrium condition, a turbulent flow in which at least two types of liquids tend to be mixed is apt to be generated.

Moreover, the test solution Ex to be stored in the mixing vessel 30 is discharged from the liquid injecting port 30*in* provided in the bottom part 30*bt* of the mixing vessel 30. With a simple structure, therefore, the test solution Ex is prevented from being left in the mixing vessel 30. As a result, the test solution Ex can be prevented from being wasted.

<(6) Variant>

The present invention is not restricted to the embodiment described above but various changes, improvements and the like can be made without departing from the scope of the present invention.

<(6-1) First Variant>

Although the inclined part 30*tp* which is tapered toward the liquid injecting port 30*in* is provided in the bottom part 30*bt* of the mixing vessel 30 so that the convex portion is formed on the boundary between the inclined part 30*tp* and the liquid storing part 30*ph* in the embodiment, the present invention is not restricted thereto. For example, it is also possible to form a large number of convex portions by providing a large number of curved concave portions in a multistage on one of sides of the liquid injecting port without providing the inclined part in the bottom part of the mixing vessel. In other words, it is sufficient that at least one convex portion is provided in the bottom part of the mixing vessel. Description will be given by taking a specific example in which a large number of convex portions are formed in the bottom part of the mixing vessel.

<(6-1-1) Structure of Mixing Vessel>

Figure 17:
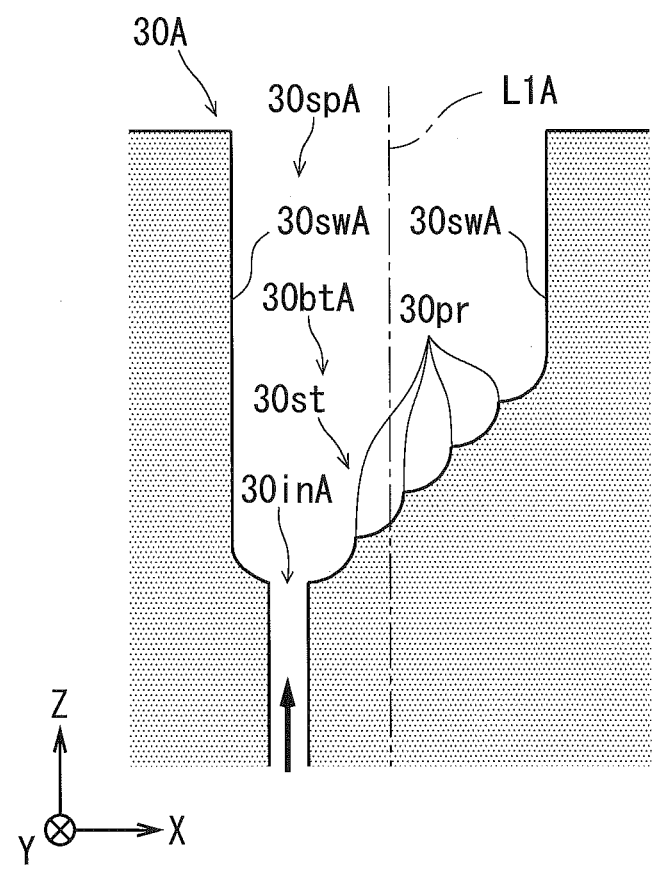
FIG. 17 is a typical sectional view showing a structure of a mixing vessel according to a first variant.

FIG. 17 is a typical sectional view showing a structure of a mixing vessel 30A in which a large number of sharp parts 30*pr* are provided in a bottom part 30*bt*A. FIG. 17 shows a section (an XZ section) which is parallel with the XZ plane of the mixing vessel 30A.

As shown in FIG. 17, the mixing vessel 30A is a vessel portion in which an upper part (the +Z direction) is opened and a liquid injecting port 30*in* A is provided in a bottom part 30*bt*A.

A space (an internal space region) 30*sp*A surrounded by an internal wall of the mixing vessel 30A is formed to take such a shape as to be rotational symmetrical with respect to every direction around an axis L1A which is parallel with the Z axis except for a space region surrounded by the bottom part 30btA, and furthermore, to have a parallel section (XY section) with a perpendicular plane to the Z axis which takes an almost circular shape.

The axis L1A is a straight line penetrating, in a vertical direction (a direction of the Z axis), a position of a center of gravity in each XY section of the space region except for the space region surrounded by the bottom part 30btA in the internal space region 30spA, and corresponds to the center line of the mixing vessel 30. In the case in which positions of the centers of gravity of the XY sections in a space region which is not surrounded by the bottom part 30btA in the internal space region 30spA are not put on a single straight line, a straight line which approximately penetrates the positions of the centers of gravity in the XY sections may be obtained as a center line L1A from the positions of the centers of gravity in the XY sections by an approximate calculation.

Moreover, a side surface (a side wall part) 30swA of the internal wall of the mixing vessel 30A that forms the space region which is not surrounded by the bottom part 30btA in the internal space region 30sp constitutes an almost parallel wall surface with the Z axis.

The liquid injecting port 30in A is provided in a shifted position from the center line L1A in a −X direction in the bottom part 30btA of the mixing vessel 30A. The liquid injecting port 30in A is caused to communicate with the minute passage 20, and the test solution Ex is injected from the minute passage 20 into the internal space region 30spA through the liquid injecting port 30in A in a +Z direction. Moreover, the liquid injecting port 30in A also serves to discharge the test solution Ex stored in the mixing vessel 30A toward the minute passage 20.

The bottom part 30btA is a portion in which the XY section of the internal space region 30spA thereof is gradually narrowed downward (the −Z direction). More specifically, the XY section of the internal space region 30spA of the bottom part 30btA is more narrowed when it approaches the liquid injecting port 30in A. Thus, the liquid injecting port 30in A is provided in a shifted position from a center of the bottom part 30btA. Herein, the center of the bottom part 30btA is a portion of the bottom part 30btA through which a straight line penetrating a center of gravity of a plane region obtained by projecting the bottom part 30btA onto the XY plane in a vertical direction (a direction of the Z axis) passes.

Moreover, the bottom part 30btA includes the liquid injecting port 30in A and a multistage part 30st, and the multistage part 30st includes four sharp parts 30pr as shown in FIG. 17.

A concave portion which is concaved like a curved surface is formed between the liquid injecting port 30in A and the sharp part 30pr in a first stage. Moreover, concave portions which are concaved like curved surfaces are formed between the sharp part 30pr in the first stage and the sharp part 30pr in a second stage, between the sharp part 30pr in the second stage and the sharp part 30pr in a third stage, and between the sharp part 30pr in the third stage and the sharp part 30pr in a fourth stage, respectively. There are increased Z coordinates of positions of an arrangement in order of the sharp pars 30pr in the first to fourth stages.

Moreover, there is employed a structure in which an angle formed with respect to a horizontal plane is rapidly varied in the sharp part 30pr with an advance from the liquid injecting port 30in A toward the sharp part 30pr over the internal wall surface of the bottom part 30btA. For this reason, any of the curved surfaces constituting the multistage part 30st is discontinuous in the sharp part 30pr, and a corresponding portion to a convex portion protruded gently is formed in the vicinity of the sharp part 30pr.

Figure 18:
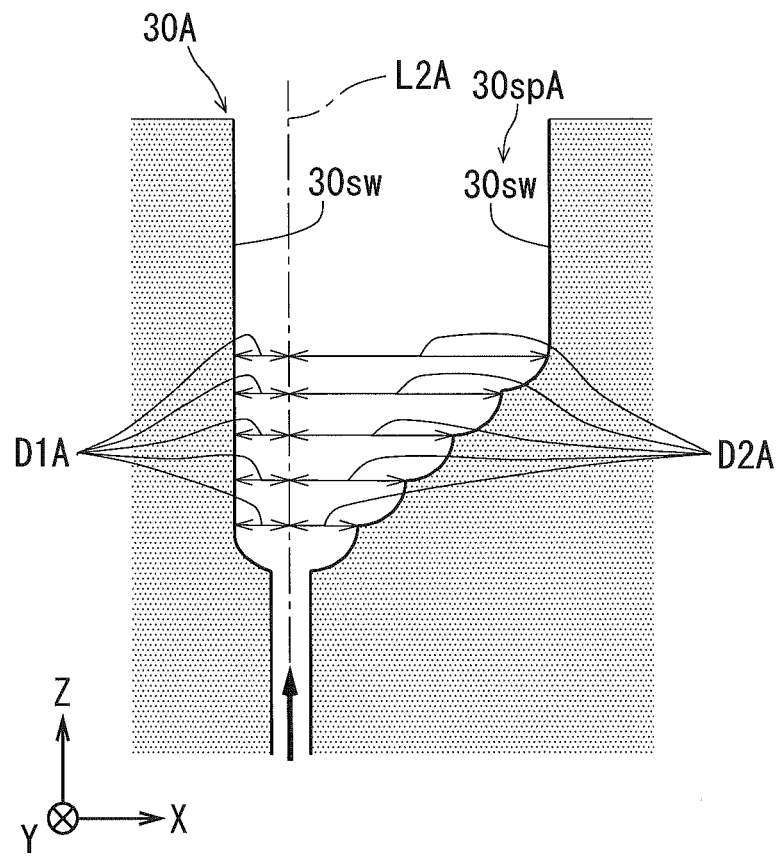
FIG. 18 is a view for explaining the structure of the mixing vessel according to the first variant.

FIG. 18 is a view for explaining the structure of the mixing vessel 30A from a further viewpoint. In the same manner as FIG. 17, in FIG. 18, a section (an XZ section) which is parallel with the XZ plane of the mixing vessel 30A is shown and a line (a virtual line) L2A extended virtually upward (in the +Z direction) via the center of the liquid injecting port 30in A is attached.

As shown in FIG. 18, the mixing vessel 30A according to the present variant includes the following structure in the same manner as the mixing vessel 30 according to the embodiment.

Above the sharp part 30pr in the first stage, in the same Z coordinates, a distance D1A from the virtual line L2A to the internal wall of the mixing vessel 30A in the −X direction is different from a distance D2A from the virtual line L2A to the internal wall of the mixing vessel 30A in the +X direction. In other words, in the XY section in a horizontal direction of the internal space region 30spA, the distance D1A from a position through which the virtual line L2A passes to the internal wall in a one direction (in this case, the −X direction) tends to be different from the distance D2A from the position through which the virtual line L2A passes to the internal wall in an opposite direction to the one direction (in this case, +X direction). More specifically, there is a tendency that the distance D2A is greater than the distance D1A.

<(6-1-2) Convection of Test Solution Generated in Mixing Vessel>

As described above, in the same manner as the liquid injecting port 30in according to the embodiment, the liquid injecting port 30in A according to the present variant is provided in a shifted position from the center line L1A of the mixing vessel 30A, and furthermore, is provided in a shifted position from the center of the bottom part 30btA. For this reason, a space region on a −X side based on the virtual line L2A in the internal space region 30spA is smaller than a space region on a +X side based on the liquid injecting port 30in A.

By such a structure, in the same manner as the mixing vessel 30 according to the embodiment, the test solution Ex (the high concentration test solution) to be injected from a portion on the −X side of the liquid injecting port 30in A once flows into a space region on the −X side in the internal space region 30spA. However, the space region on the −X side is small. For this reason, the high concentration test solution tends to flow into a space region on the +X side in the internal space region 30spA. The flow of the high concentration test solution tends to be joined with the flow of the test solution Ex (the low concentration test solution) to be injected into the space region on the +X side in the internal space region 30spA from a portion on the +X side of the liquid injecting port 30in A. By the structure of the mixing vessel 30A, therefore, there is generated convection of the test solution Ex in which the high concentration test solution and the low concentration test solution are easily mixed and stirred. At this time, the flow of the test solution Ex in the internal space region 30spA tends to be a turbulent flow.

<(6-1-3) Behavior of Test Solution in Initial Stage of Injection into Mixing Vessel>

According to the structure of the mixing vessel 30A, the mixture and stirring of the high concentration test solution and the low concentration test solution is also promoted depending on the behavior of the test solution Ex in a stage (an initial stage of the injection) immediately after the test solution Ex is started to be injected into the mixing vessel 30A.

FIGS. 19 to 28 are typical views showing a state of the test solution Ex in the mixing vessel 30A in the initial stage of the injection. In FIGS. 19 to 28, a shape of an inner edge of the XZ section in the vicinity of the bottom part 30btA of the mixing vessel 30A is drawn in a thick line, and a shape of the XZ section of a liquid level ExsA in the test solution Ex is drawn in a solid line. With reference to FIGS. 19 to 28, the behavior of the test solution Ex in the mixing vessel 30A in the initial stage of the injection will be described below.

In the initial stage of the injection, the test solution Ex in the mixing vessel 30A exhibits the following behaviors (A) to (E) in sequence.

Figure 19:
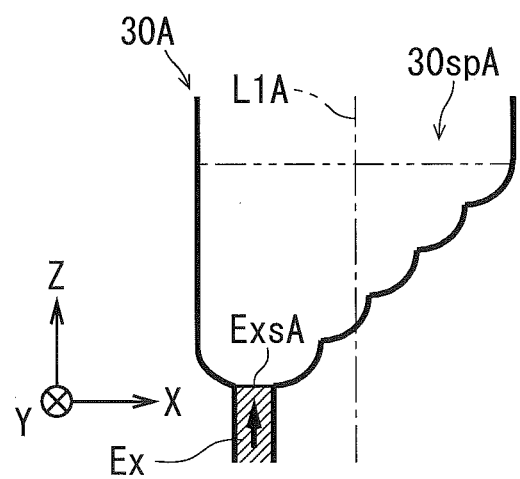
FIG. 19 is a view typically showing a behavior of the test solution in the mixing vessel according to the first variant.
Figure 20:
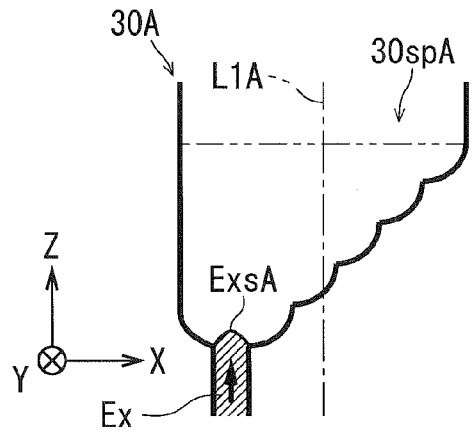
FIG. 20 is a view typically showing a behavior of the test solution in the mixing vessel according to the first variant.

(A) As shown in FIG. 19, a headmost portion of the test solution Ex reaches the liquid injecting port 30in A of the mixing vessel 30A from the minute passage 20. Before the liquid level ExsA of the test solution Ex reaches the sharp part 30pr in the first stage, the liquid level ExsA is moved in the +Z direction while an almost orthogonal state to a virtual line L2A extended virtually from the center of the liquid injecting port 30in A in the +Z direction is maintained as shown in FIG. 20. In other words, the liquid injecting port 30in A takes such a shape as to be rotational symmetrical with respect to every direction around the virtual line L2A.

Figure 21:
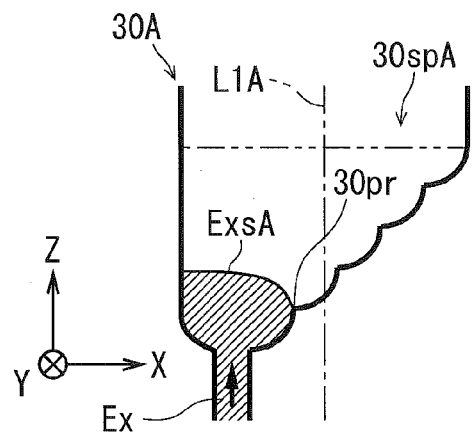
FIG. 21 is a view typically showing a behavior of the test solution in the mixing vessel according to the first variant.

(B) When the liquid level ExsA reaches the sharp part 30pr in the first stage, a suppressing force generated by a surface tension in a reverse direction to a direction in which the test solution Ex exceeds the sharp part 30pr in the first stage is greater than a force for exceeding the sharp part 30pr by the test solution Ex depending on the dead weight of the test solution Ex. At this time, an interface (a three-phase interface) where three phases, that is, a solid phase, a liquid phase and a gas phase are provided in contact with each other stays in the position of the sharp part 30pr in the first stage for a while irrespective of an increase in the amount of the test solution Ex to be injected into the mixing vessel 30A. On the other hand, as shown in FIG. 21, the three-phase interface on the −X side in the internal space region 30spA is moved in an upward direction which is opposite to a direction of gravity. At this time, the shape of the liquid level ExsA forms a convex surface.

Figure 22:
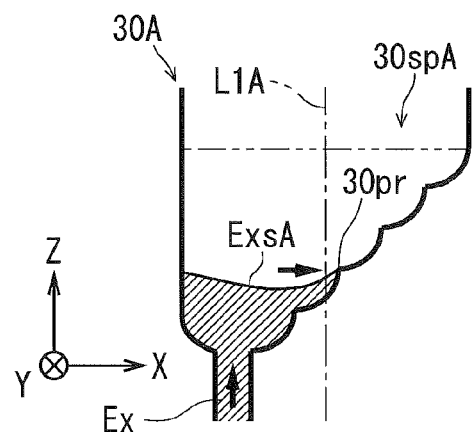
FIG. 22 is a view typically showing a behavior of the test solution in the mixing vessel according to the first variant.

(C) When the amount of the test solution Ex to be injected into the internal space region 30spA is increased so that a contact angle of the test solution Ex with respect to the bottom part 30btA exceeds a predetermined angle in the sharp part 30pr, a force of the test solution Ex to exceed the sharp part 30pr depending on the dead weight of the test solution Ex is greater than a suppressing force caused by a surface tension. At this time, as shown in FIG. 22, a balance of the forces of the three-phase interface is lost so that the test solution Ex exceeds the sharp part 30pr and the shape of the liquid level ExsA takes a shape of a concave surface. When the liquid level ExsA is changed from the convex surface to the concave surface, the portion in the vicinity of the liquid level ExsA in the test solution Ex is violently shaken. As a result, a turbulent flow is generated in the vicinity of the liquid level ExsA in the test solution Ex so that the mixture and stirring of the test solution Ex is promoted.

Figure 23:
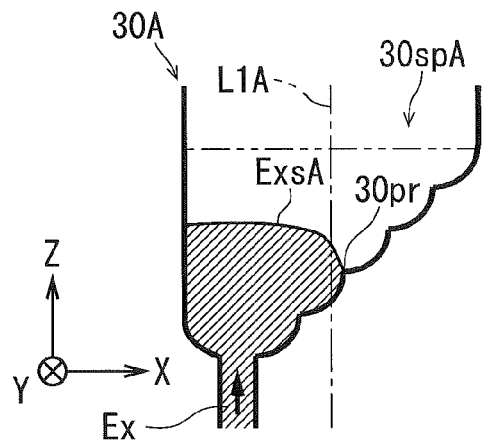
FIG. 23 is a view typically showing a behavior of the test solution in the mixing vessel according to the first variant.

(D) When the liquid level ExsA reaches the sharp part 30pr in the second stage, a suppressing force generated by a surface tension in a reverse direction to a direction in which the test solution Ex exceeds the sharp part 30pr in the second stage is greater than a force of the test solution Ex to exceed the sharp part 30pr depending on the dead weight of the test solution Ex. At this time, a three-phase interface stays in the position of the sharp part 30pr in the second stage for a while irrespective of an increase in the amount of the test solution Ex to be injected into the mixing vessel 30A. On the other hand, as shown in FIG. 23, the three-phase interface on the −X side in the internal space region 30spA is moved in an upward direction which is opposite to a direction of gravity. At this time, the shape of the liquid level ExsA forms a convex surface.

Figure 24:
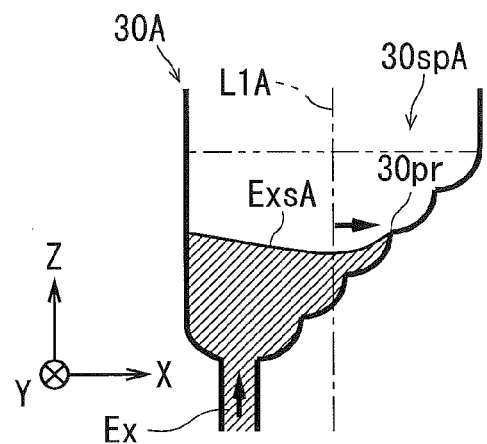
FIG. 24 is a view typically showing a behavior of the test solution in the mixing vessel according to the first variant.
Figure 25:
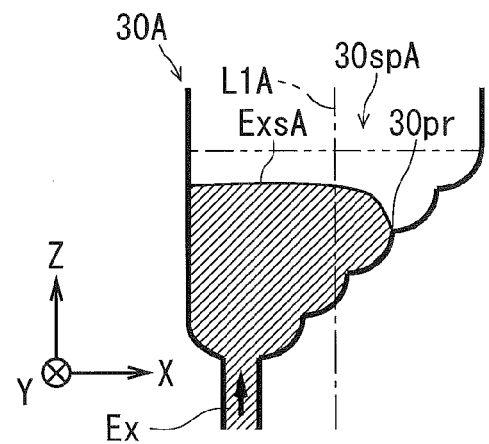
FIG. 25 is a view typically showing a behavior of the test solution in the mixing vessel according to the first variant.
Figure 26:
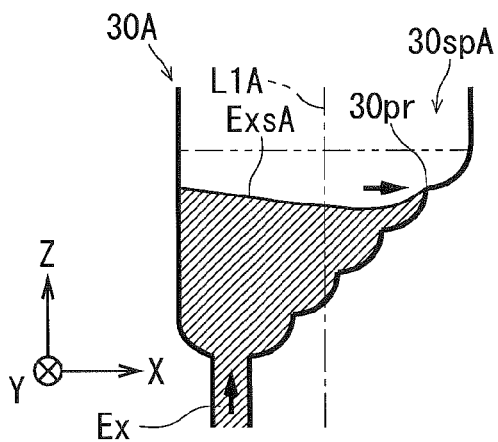
FIG. 26 is a view typically showing a behavior of the test solution in the mixing vessel according to the first variant.
Figure 27:
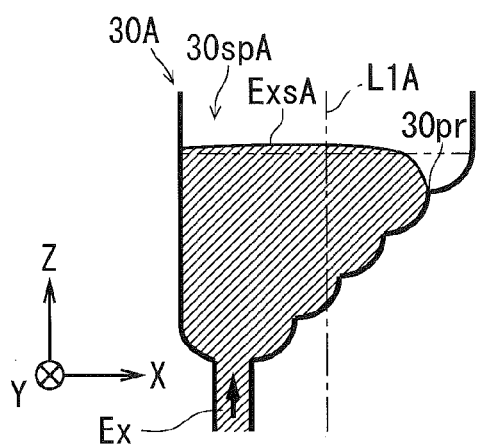
FIG. 27 is a view typically showing a behavior of the test solution in the mixing vessel according to the first variant.
Figure 28:
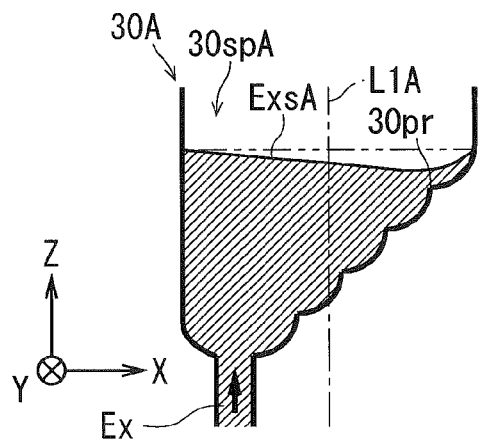
FIG. 28 is a view typically showing a behavior of the test solution in the mixing vessel according to the first variant.

(E) As shown in FIG. 24, then, the same behavior as the behavior (C) is generated so that a turbulent flow is generated when the liquid level ExsA exceeds the sharp part 30pr in the second stage and the mixture and stirring of the test solution Ex is thus promoted. As shown in FIGS. 25 to 28, the same behavior as the behaviors (D) and (C) is alternately repeated. Every time the liquid level ExsA exceeds the sharp part 30pr, consequently, the liquid level ExsA is violently shaken so that the mixture and stirring of the test solution Ex is promoted.

Also in the case in which the mixing vessel 30A according to the first variant described above is employed, at least two types of liquids can be efficiently mixed with a simple structure in the same manner as in the microfluidic chip 1 according to the embodiment.

<(6-2) Second Variant>

Although the internal space region 30sp takes such a shape as to be rotational symmetrical with respect to every direction around the center line L1 which is parallel with the Z axis except for the vicinity of the liquid injecting port 30in in the embodiment, the present invention is not restricted thereto. For example, the internal space region 30sp may be reduced or enlarged in a direction along the X axis or the Y axis. In other words, the XY section of the internal space region 30sp except for the vicinity of the liquid injecting port 30in does not take a circular shape but may take various shapes.

Figure 29:
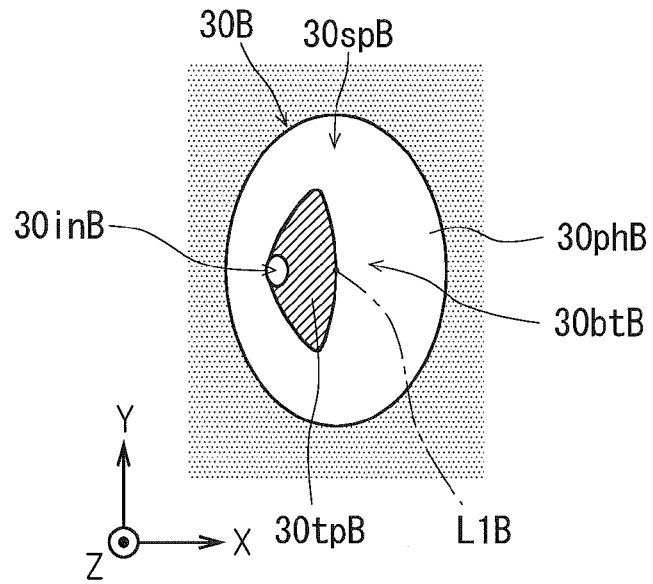
FIG. 29 is a typical plan view showing a structure of a mixing vessel according to a second variant.

FIG. 29 is a typical view showing a structure of a mixing vessel 30B obtained by reducing the mixing vessel 30 according to the embodiment in a direction along the X axis. As shown in FIG. 29, the mixing vessel 30B forms an internal space region 30spB. Moreover, a bottom part 30btB of the mixing vessel 30B includes a liquid injecting port 30in B, an inclined portion 30tpB and a liquid storing part 30phB. The internal space region 30spB takes a shape of an elliptic cylinder around an axis L1B which is parallel with the Z axis except for a space region surrounded by the bottom part 30btB.

Figure 30:
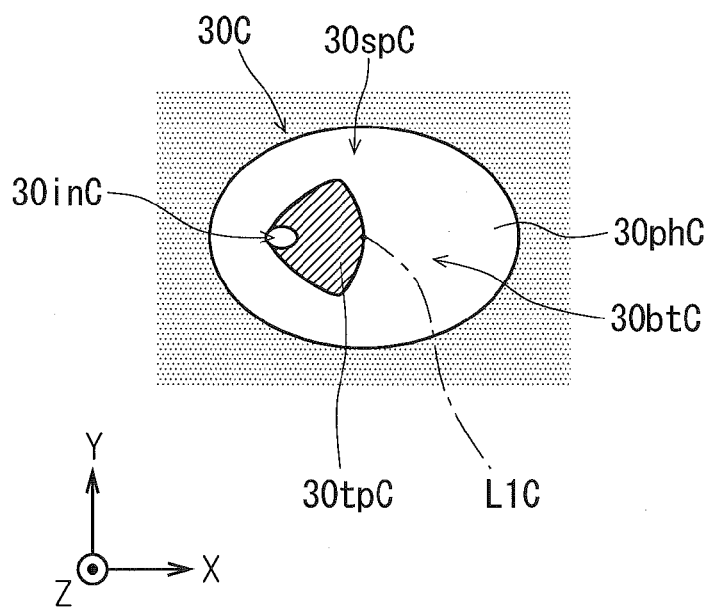
FIG. 30 is a typical plan view showing a structure of a mixing vessel according to a second variant.

Moreover, FIG. 30 is a typical view showing a structure of a mixing vessel 30C obtained by reducing the mixing vessel 30 according to the embodiment in a direction along the Y axis. As shown in FIG. 30, the mixing vessel 30C forms an internal space region 30spC. Moreover, a bottom part 30btC of the mixing vessel 30C includes a liquid injecting port 30in C, an inclined part 30tpC and a liquid storing part 30phC. The internal space region 30spC takes a shape of an elliptic cylinder around an axis L1C which is parallel with the Z axis except for a space region surrounded by the bottom part 30btC.

<(6-3) Third Variant>

Although one type of test solution Ex is injected from the injecting/discharging port 40 into the minute passage 20 and two types of test solutions, that is, the high concentration test solution and the low concentration test solution are generated by the reaction in the reactor 50 of the minute passage 20 in the embodiment, the present invention is not restricted thereto. For example, introducing parts for introducing two types of different liquids (A and B solutions) respectively may be provided on an upstream of the minute passage 20. Description will be given by taking a specific example.

Figure 31:
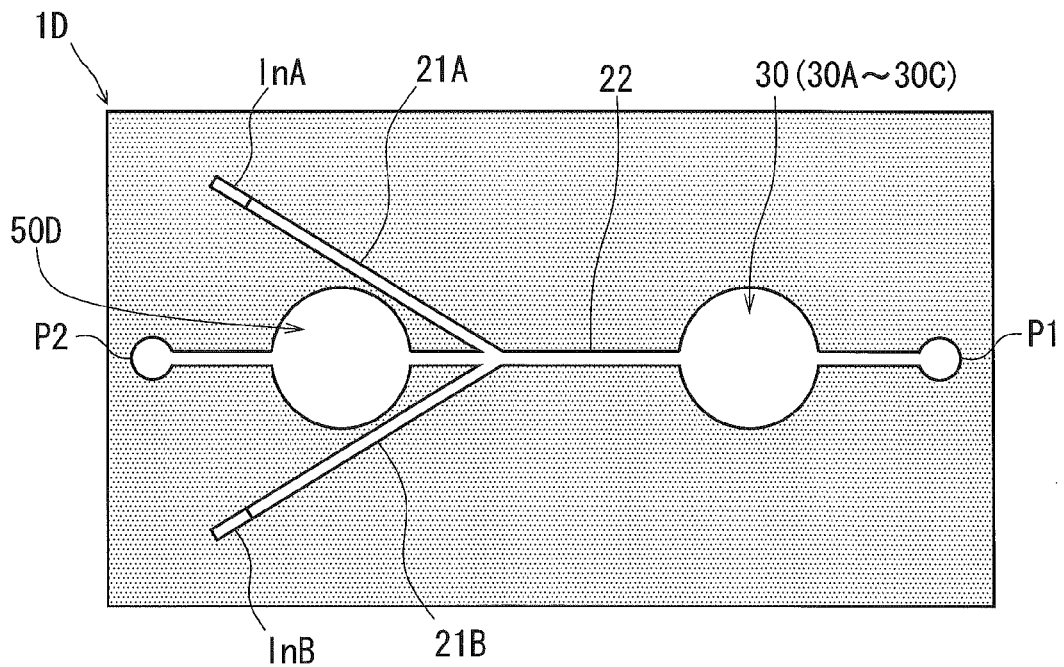
FIG. 31 is a typical view showing a schematic structure of a microfluidic chip according to a third variant.

FIG. 31 is a typical view showing a schematic structure of a microfluidic chip 1D according to a third variant. FIG. 31 shows a rough arrangement of each portion of the microfluidic chip 1D seen from above.

As shown in FIG. 31, the microfluidic chip 1D includes an A solution introducing part InA, a B solution introducing part InB, an A solution supplying path 21A, a B solution supplying part 21B, a minute passage 22, a mixing vessel 30, a reacting vessel part 50D, a first pump connecting part P1 and a second pump connecting part P2.

The A solution introducing part InA is provided to communicate with the minute passage 22 through the A solution supplying path 21A. Moreover, an A solution supplying source is connected to the A solution introducing part InA. For this reason, the A solution to be introduced in the A solution introducing part InA is supplied to the minute passage 22 through the A solution supplying path 21A.

The B solution introducing part InB is provided to communicate with the minute passage 22 through the B solution supplying path 21B. Moreover, a B solution supplying source is connected to the B solution introducing part InB. For this reason, the B solution to be introduced in the B solution introducing part InB is supplied to the minute passage 22 through the B solution supplying path 21B.

Herein, a portion in which the A solution supplying path 21A is connected to the minute passage 22 and a portion in which the B solution supplying path 21B is connected to the minute passage 22 are disposed close to each other.

The minute passage 22 is a portion corresponding to the minute passage 20 according to the embodiment, and one of the ends of the minute passage 22 communicates with the mixing vessel 30 through a predetermined passage.

The mixing vessel 30 is the same portion as the mixing vessel 30 according to the embodiment.

The reacting vessel part 50D is a container provided with a reactor corresponding to the reactor 50 according to the embodiment and communicate with the other end of the minute passage 22.

The first pump connecting part P1 communicates with the mixing vessel 30 and is connected to a pump (a liquid feeding pump) for feeding a liquid to the mixing vessel 30.

The second pump connecting part P2 communicates with the reacting vessel part 50D and is connected to a pump (a liquid feeding pump) for feeding a liquid to the reacting vessel part 50D.

Figure 32:
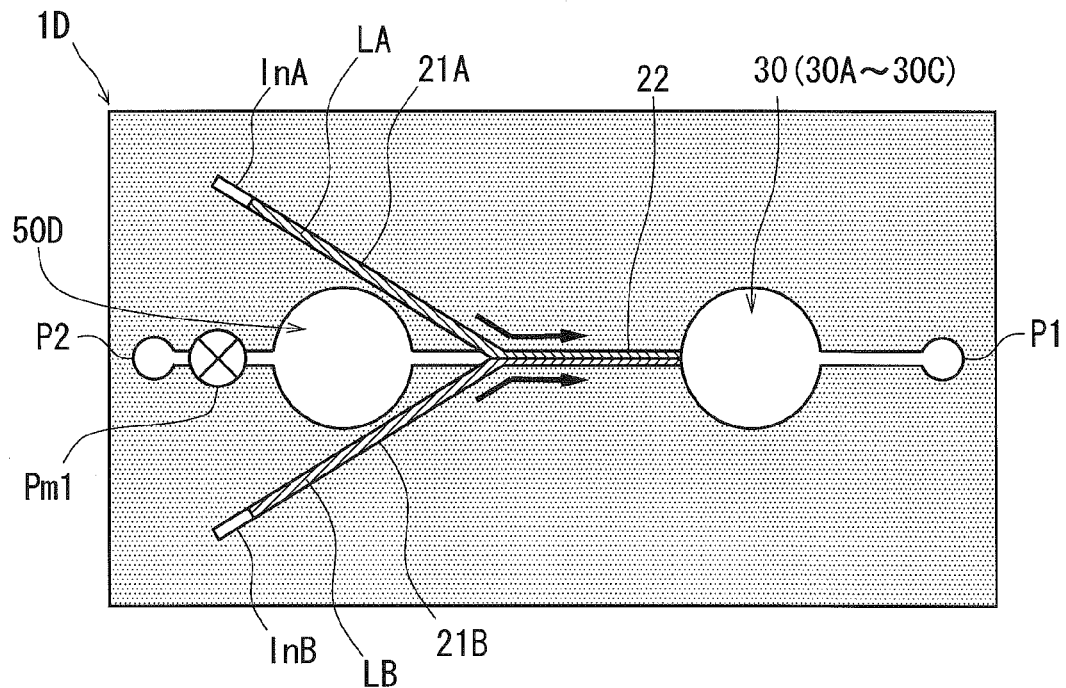
FIG. 32 is a typical view showing a mode for using the microfluidic chip according to the third variant.
Figure 33:
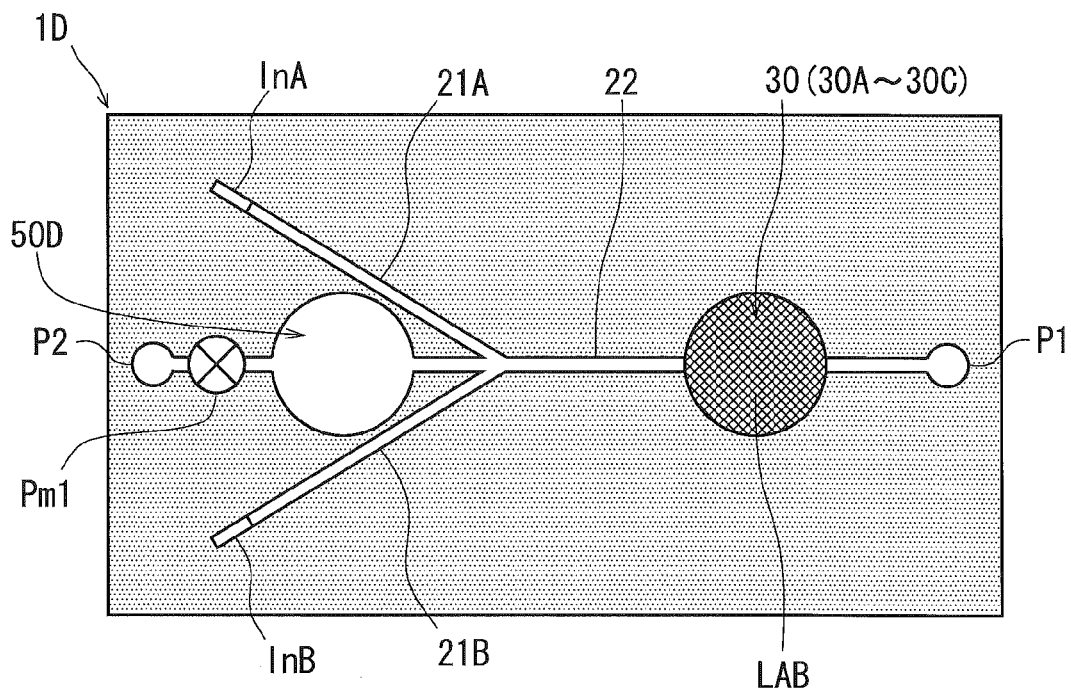
FIG. 33 is a typical view showing a mode for using the microfluidic chip according to the third variant.
Figure 34:
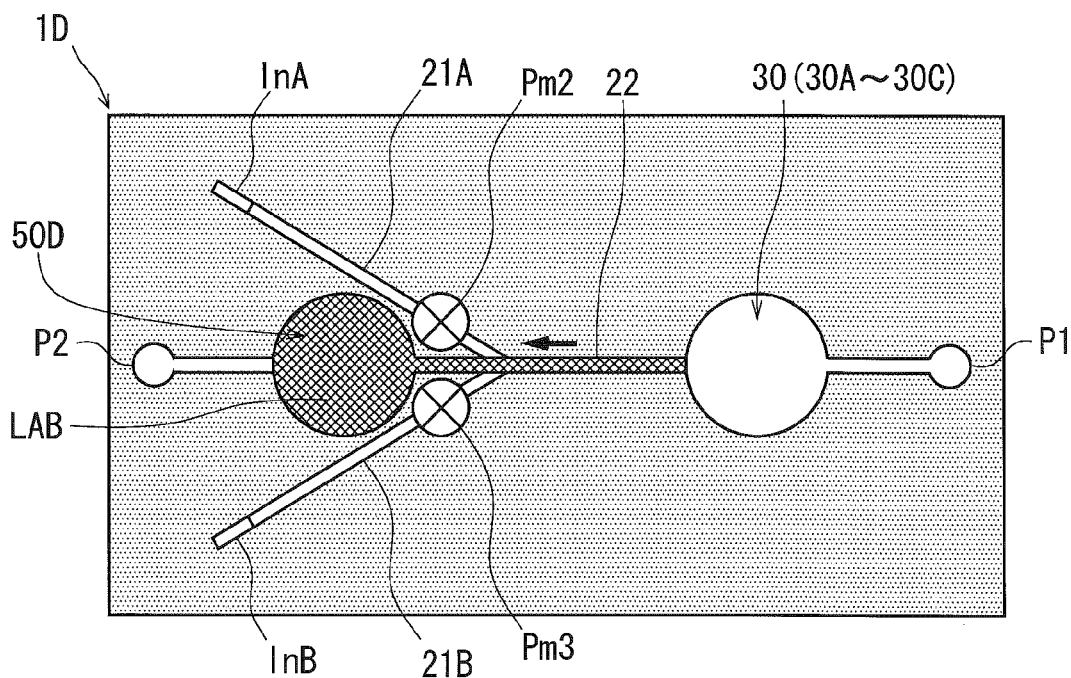
FIG. 34 is a typical view showing a mode for using the microfluidic chip according to the third variant.

FIGS. 32 to 34 are views for explaining a flow of a liquid in an inspection using the microfluidic chip 1D. In the microfluidic chip 1D according to the present variant, the following steps (a) to (c) are executed sequentially. Consequently, it is possible to carry out a reaction of liquids and to detect a result of the reaction with a simple structure.

(a) A sucking operation is carried out by the liquid feeding pump connected to the first pump connecting part P1. As shown in FIG. 32, consequently, an A solution LA and a B solution LB are introduced from the A solution introducing part InA and the B solution introducing part InB respectively and are supplied to the minute passage 22 through the A solution supplying path 21A and the B solution supplying path 21B respectively. At this time, a first valve Pm1 provided in a path causing the reacting vessel part 50D and the second pump connecting part P2 to communicate with each other is brought into a closing state (a closing state).

(b) The sucking operation of the solution feeding pump connected to the first pump connecting part P1 is maintained so that the A solution LA and the B solution LB are injected from the minute passage 22 into the mixing vessel 30 as shown in FIG. 33. At this time, the A solution LA and the B solution LB are mixed with each other so that a mixed solution LAB is generated in the mixing vessel 30.

(c) A second valve Pm2 provided in the A solution supplying path 21A is set into the closing state and a third valve Pm3 provided in the B solution supplying path 21B is set into the closing state. The first valve Pm1 is set from the closing state into an opening state (an opening state), and furthermore, the sucking operation is carried out by the solution feeding pump connected to the second pump connecting part P2. At this time, as shown in FIG. 34, the mixed solution LAB is introduced from the mixing vessel 30 into the reacting vessel part 50D through the minute passage 22. Consequently, a reaction to the mixed solution LAB is generated so that a result of the reaction is detected in the reacting vessel part 50D.

The reaction in the reacting vessel part 50D may be such that biochemicals react in the same manner as in the reaction in the reactor 50 according to the embodiment or may be any reaction. Referring to the method of detecting the result of the reaction, moreover, there is no particular restriction and any characteristic such as an electrical characteristic or an optical characteristic may be detected.

When the A solution LA and the B solution LB are introduced into the microfluidic chip 1D and the mixed solution LAB is caused to react in the reacting vessel part 50D, the microfluidic chip 1D is provided on a special device. For this reason, the special device may include various structures for detecting the result of the reaction.

Moreover, the microfluidic chip 1D may be removed from the special device and provided on another analyzing device to detect the result of the reaction. In addition, the mixing vessel part 50D of the microfluidic chip 1D may be visually recognized to detect the result of the reaction by a person.

Furthermore, various optical members, for example, a lens for assisting the detection of an optical characteristic, a waveguide, a prism and the like may be provided in the microfluidic chip 1D.

<(6-4) Fourth Variant>

Although the A solution and the B solution are injected into the mixing vessel 30 at a time so that the A solution and the B solution are mixed in the third variant, the present invention is not restricted thereto. For example, at least two mixing vessels 30 may be provided in the microfluidic chip. Description will be given by taking a specific example.

Figure 35:
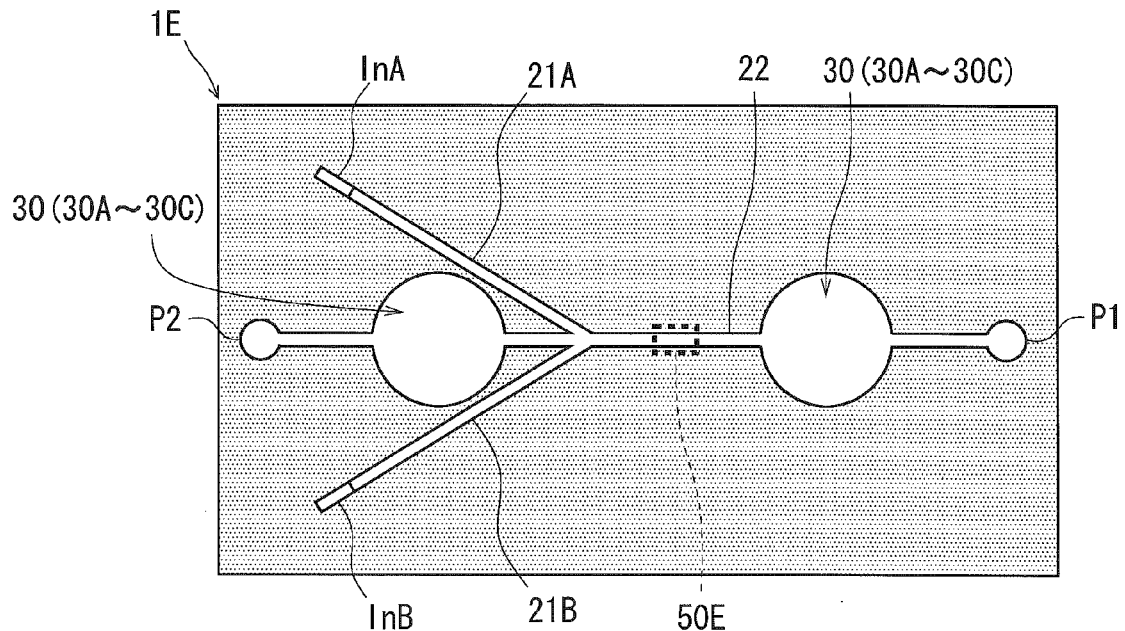
FIG. 35 is a typical view showing a schematic structure of a microfluidic chip according to a fourth variant.

FIG. 35 is a typical view showing a schematic structure of a microfluidic chip 1E according to a fourth variant. FIG. 35 shows a rough arrangement of each portion of the microfluidic chip 1E seen from above. As shown in FIG. 35, the microfluidic chip 1E according to the fourth variant includes a structure in which the reacting vessel part 50D is replaced with the mixing vessel 30 and the reactor 50 is provided on the lower surface of the minute passage 22 as compared with the microfluidic chip 1D according to the third variant. Since the other structures are the same, the same reference symbols are given and description will be properly omitted.

In the present variant, in FIG. 35, a right mixing vessel 30 will be referred to as a first mixing vessel 30 and a left mixing vessel 30 will be referred to as a second mixing vessel 30.

Figure 36:
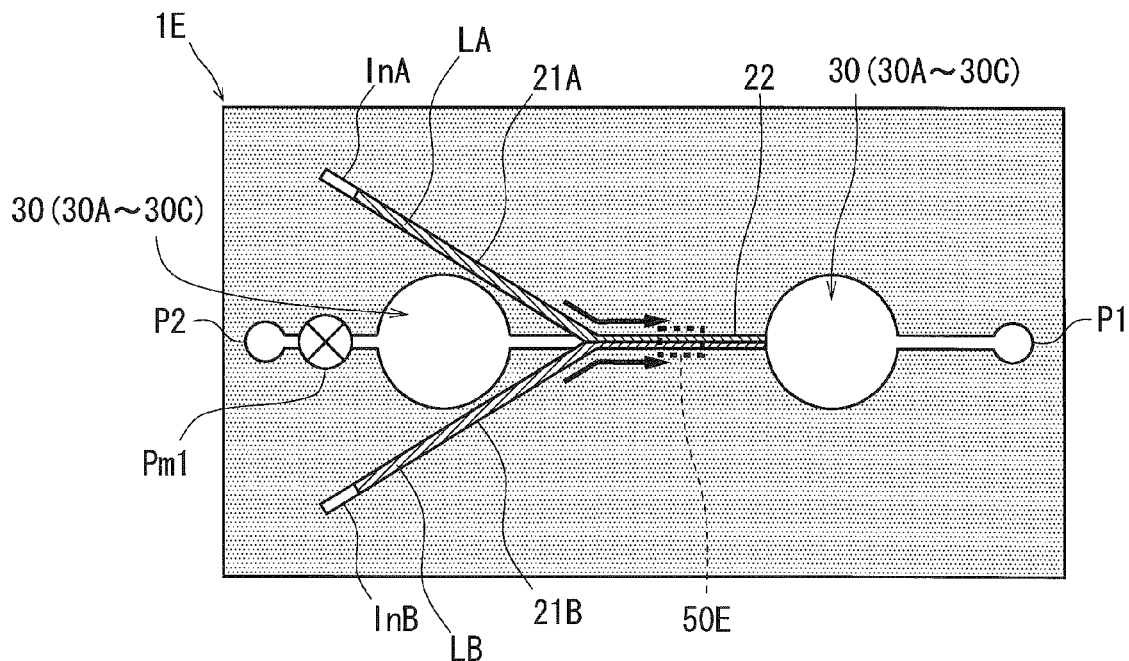
FIG. 36 is a typical view showing a mode for using the microfluidic chip according to the fourth variant.
Figure 37:
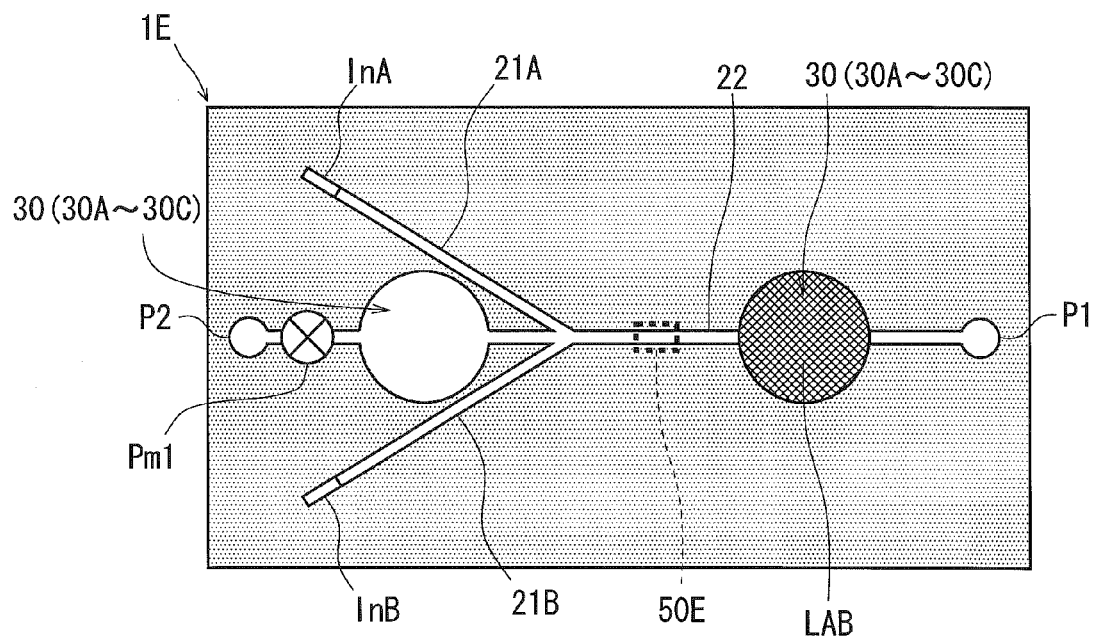
FIG. 37 is a typical view showing a mode for using the microfluidic chip according to the fourth variant.
Figure 38:
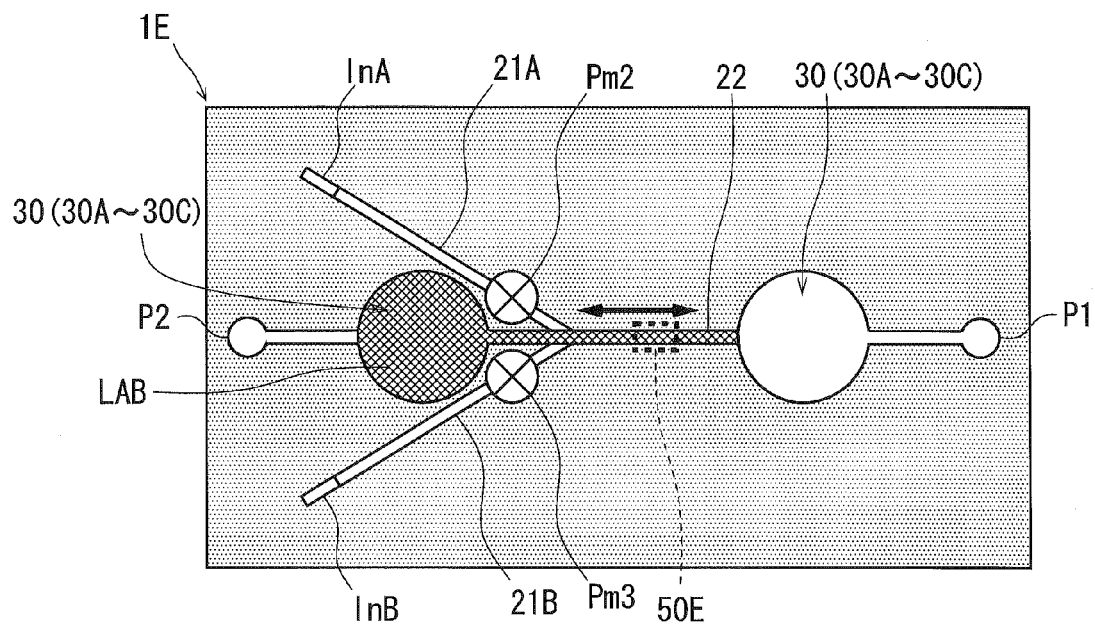
FIG. 38 is a typical view showing a mode for using the microfluidic chip according to the fourth variant.

FIGS. 36 to 38 are views for explaining a flow of a liquid in an inspection using the microfluidic chip 1E. In the microfluidic chip 1E according to the present variant, the following steps (A) to (F) are executed sequentially. Consequently, it is possible to carry out a reaction of liquids and to detect a result of the reaction with a simple structure.

(A) A sucking operation is carried out by the liquid feeding pump connected to the first pump connecting part P1. As shown in FIG. 36, consequently, an A solution LA and a B solution LB are introduced from the A solution introducing part InA and the B solution introducing part InB respectively and are supplied to the minute passage 22 through the A solution supplying path 21A and the B solution supplying path 21B respectively. At this time, a first valve Pm1 provided in a path causing the second mixing vessel 30 and the second pump connecting part P2 to communicate with each other is brought into a closing state.

(B) The sucking operation of the solution feeding pump connected to the first pump connecting part P1 is maintained so that the A solution LA and the B solution LB are injected from the minute passage 22 into the first mixing vessel 30 as shown in FIG. 37. At this time, the A solution LA and the B solution LB are mixed with each other so that a mixed solution LAB is generated in the first mixing vessel 30.

(C) A second valve Pm2 provided in the A solution supplying path 21A is set into the closing state and a third valve Pm3 provided in the B solution supplying path 21B is set into the closing state. The first valve Pm1 is set from the closing state into an opening state, and furthermore, the sucking operation is carried out by the solution feeding pump connected to the second pump connecting part P2. At this time, as shown in FIG. 38, the mixed solution LAB passes through the minute passage 22, and furthermore, the mixed solution LAB is moved from the first mixing vessel 30 to the second mixing vessel 30. When the mixing solution LAB passes through the minute passage 22, it reacts to the reactor 50E and a concentration distribution of a predetermined component related to the reaction is generated in the mixed solution LAB through the reaction.

(D) The mixed solution LAB having the concentration distribution of the predetermined component generated is injected into the second mixing vessel 30. Consequently, the mixed solution LAB is mixed and stirred so that a concentration of the predetermined component is made uniform.

(E) In a condition in which the second valve Pm2 and the third valve Pm3 are set into the closing state, the sucking operation is carried out by means of the liquid feeding pump connected to the first pump connecting part P1. Consequently, the mixing solution LAB passes through the minute passage 22, and furthermore, the mixed solution LAB is moved from the second mixing vessel 30 to the first mixing vessel 30. At this time, in the passage of the mixing solution LAB through the minute passage 22, the mixed solution LAB which does not sufficiently react in a last reaction generates the reaction to the reactor 50E again. By the reaction, a concentration distribution of a predetermined component related to the reaction is generated in the mixing solution LAB.

(F) The mixing solution LAB having the concentration distribution of the predetermined component generated is injected into the first mixing vessel 30. Consequently, the mixing solution LAB is mixed and stirred so that the concentration of the predetermined component is made uniform.

By the steps (A) to (F), the reaction to the mixing solution LAB is sufficiently generated in the reactor 50E and a result of the reaction is detected. By the repetition of the steps (C) to (F), furthermore, the reaction to the mixed solution LAB may be sufficiently carried out in the reactor 50E.

<(6-5) Other Variants>

⊚Although the test solution Ex is injected into the +Z direction from the minute passage 20 to the mixing vessel 30 in the embodiment, the present invention is not restricted thereto. The passage (the connecting passage) connecting the minute passage 20 to the mixing vessel 30 may be slightly inclined to the Z axis. When the connecting passage is inclined in such a manner that the test solution Ex can easily flow onto the inclined portion 30*tp*, there is reduced an amount of the generation of the shake in the liquid level Exs utilizing the surface tension. For this reason, it is preferable that the connecting passage should be extended in the vertical direction (+Z direction) or should be inclined in an opposite direction to the inclined portion 30*tp*.

From another viewpoint, the direction (the injecting direction) in which the test solution Ex is injected from the liquid injecting port 30*in* to the internal space region 30*sp* is preferably close to the vertical direction (in this case, +Z direction) in place of the horizontal direction (in this case, the +X direction) in the vicinity of the liquid injecting port 30*in* in the bottom part 30*bt*.

⊚Although the internal wall surface of the mixing vessel 30 is mainly constituted by the curved surface in the embodiment, moreover, the present invention is not restricted thereto but the internal wall surface of the mixing vessel may be mainly constituted by a combination of planes, for example. In respect of the prevention of the test solution Ex from being left, for example, it is preferable that the concave portion should be constituted by the curved surface as compared with the case in which the concave portion constituting the bottom part of the mixing vessel is constituted by the combination of the planes.

⊚Although the upper portion excluding the bottom part 30*bt* of the mixing vessel 30 takes such a shape as to be rotational symmetrical around the axis L1 in the embodiment, moreover, the present invention is not restricted thereto. For example, it is also possible to propose a mode for taking various shapes in which the upper portion excluding the bottom part 30*bt* in the mixing vessel 30 meanders, or the like.

⊚In the embodiment, the relationship between the capacity of the mixing vessel 30 and the volume of the liquid to be injected into the mixing vessel 30 are not particularly described. From this viewpoint, it is also possible to propose an example in which the capacity of the mixing vessel 30 is approximately 1 to 1.5 times as much as the volume of the liquid to be injected into the mixing vessel 30 in respect of non-enlargement of the microfluidic chip 1 with a sufficient mixture of the liquids which makes the best of the structure of the mixing vessel 30.

⊚Although the two types of liquids, that is, the A solution and the B solution are to be mixed in the mixing vessel 30 in the third and fourth variants, furthermore, the present invention is not restricted thereto but at least two types of liquids may be applied.

⊚It is apparent that all or a part of the structures for the embodiment and the various variants can be properly combined within a consistent range.

The invention claimed is:

1. A micro mixer comprising:
   a minute passage through which first and second liquids are caused to flow; and
   a mixing vessel in which a liquid injecting port caused to communicate with said minute passage is provided in a bottom part in depth direction of said mixing vessel;
   wherein said minute passage includes a first passage portion extending in a horizontal direction and a second passage portion extending vertically upward on one end of said first passage portion, and
   wherein said liquid injecting port is provided to communicate with said second passage portion, and is provided in a shifted position from a center of said bottom part in said bottom part.

2. The micro mixer according to claim 1, wherein at least one convex portion is provided in the bottom part of said mixing vessel.

3. The micro mixer according to claim 1, wherein a first variation of an angle formed by an internal wall surface of said mixing vessel and a horizontal surface in a passage advanced by a predetermined distance in a first direction from said liquid injecting port over said internal wall surface of said mixing vessel is different from a second variation of an angle formed by said internal wall surface of said mixing vessel and said horizontal surface in a path advanced by said predetermined distance in a second direction which is opposite to said first direction from said liquid injecting port over said internal wall surface of said mixing vessel.

4. The micro mixer according to claim 3, wherein said first variation is relatively greater than said second variation, and
an inclined portion tapered toward said liquid injecting port is provided in said second direction based on said liquid injecting port in the bottom part of said mixing vessel.

5. The micro mixer according to claim 1, wherein an internal wall surface of said mixing vessel has water repellency.

6. The micro mixer according to claim 1, wherein said liquid injecting port discharges a liquid stored in said mixing vessel toward said minute passage.

7. The micro mixer according to claim 1, further comprising:
a first supplying path configured to supply said first liquid to said minute passage; and
a second supplying path configured to supply said second liquid to said minute passage.

8. A microfluidic chip comprising:
the micro mixer according to claim 1; and
a reactor, which is provided in the vicinity of an internal wall surface of said minute passage through which a mixed liquid generated by mixing said first and second liquids in said mixing vessel is to be discharged from said mixing vessel, to which a reactant for carrying out a reaction to a substance contained in said mixed liquid is fixed.

9. A micro mixer comprising:
a minute passage through which first and second liquids are caused to flow; and
a mixing vessel in which a liquid injecting port caused to communicate with said minute passage is provided in a bottom part in depth direction of said mixing vessel;
wherein said minute passage includes a first passage portion extending in a horizontal direction and a second passage portion extending vertically upward on one end of said first passage portion, and
wherein said liquid injecting port is provided to communicate with said second passage portion, and is provided in a shifted position from a center line of said mixing vessel.

10. The micro mixer according to claim 9, wherein at least one convex portion is provided in the bottom part of said mixing vessel.

11. The micro mixer according to claim 9, wherein a first variation of an angle formed by an internal wall surface of said mixing vessel and a horizontal surface in a passage advanced by a predetermined distance in a first direction from said liquid injecting port over said internal wall surface of said mixing vessel is different from a second variation of an angle formed by said internal wall surface of said mixing vessel and said horizontal surface in a path advanced by said predetermined distance in a second direction which is opposite to said first direction from said liquid injecting port over said internal wall surface of said mixing vessel.

12. The micro mixer according to claim 11, wherein said first variation is relatively greater than said second variation, and
an inclined portion tapered toward said liquid injecting port is provided in said second direction based on said liquid injecting port in the bottom part of said mixing vessel.

13. The micro mixer according to claim 9, wherein an internal wall surface of said mixing vessel has water repellency.

14. The micro mixer according to claim 9, wherein said liquid injecting port discharges a liquid stored in said mixing vessel toward said minute passage.

15. The micro mixer according to claim 9, further comprising:
a first supplying path configured to supply said first liquid to said minute passage; and
a second supplying path configured to supply said second liquid to said minute passage.

16. A microfluidic chip comprising:
the micro mixer according to claim 9; and
a reactor, which is provided in the vicinity of an internal wall surface of said minute passage through which a mixed liquid generated by mixing said first and second liquids in said mixing vessel is to be discharged from said mixing vessel, to which a reactant for carrying out a reaction to a substance contained in said mixed liquid is fixed.

17. A micro mixer comprising:
a minute passage through which first and second liquids are caused to flow; and
a mixing vessel in which a liquid injecting port caused to communicate with said minute passage is provided in a bottom part in depth direction of said mixing vessel;
wherein said minute passage includes a first passage portion extending in a horizontal direction and a second passage portion extending vertically upward on one end of said first passage portion,
wherein said liquid injecting port is provided to communicate with said second passage portion; and
wherein in a section in a horizontal direction of an internal space region surrounded by an internal wall surface of said mixing vessel, a first distance from a position through which a virtual line that is virtually extended upward from a center of said liquid injecting port passes to said internal wall surface in relation to a one direction is different from a second distance from a position through which said virtual line passes to said internal wall surface in relation to an opposite direction to said one direction.

18. The micro mixer according to claim 17, wherein at least one convex portion is provided in the bottom part of said mixing vessel.

19. The micro mixer according to claim 17, wherein a first variation of an angle formed by said internal wall surface of said mixing vessel and a horizontal surface in a passage advanced by a predetermined distance in a first direction from said liquid injecting port over said internal wall surface of said mixing vessel is different from a second variation of an angle formed by said internal wall surface of said mixing vessel and said horizontal surface in a path advanced by said predetermined distance in a second direction which is opposite to said first direction from said liquid injecting port over said internal wall surface of said mixing vessel.

20. The micro mixer according to claim 19, wherein said first variation is relatively greater than said second variation, and
an inclined portion tapered toward said liquid injecting port is provided in said second direction based on said liquid injecting port in the bottom part of said mixing vessel.

* * * * *